United States Patent
Sutou

(10) Patent No.: US 9,509,971 B2
(45) Date of Patent: Nov. 29, 2016

(54) IMAGE PROCESSING DEVICE, IMAGE PROCESSING METHOD, AND PROGRAM

(71) Applicant: SONY CORPORATION, Tokyo (JP)

(72) Inventor: Yasuhiro Sutou, Tokyo (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 14/032,566

(22) Filed: Sep. 20, 2013

(65) Prior Publication Data

US 2014/0098089 A1    Apr. 10, 2014

(30) Foreign Application Priority Data

Oct. 10, 2012  (JP) ................................ 2012-224871

(51) Int. Cl.
  H04N 13/00   (2006.01)
  H04N 13/04   (2006.01)
  G06T 7/00    (2006.01)

(52) U.S. Cl.
  CPC ......... H04N 13/0022 (2013.01); G06T 7/0075 (2013.01); H04N 13/0011 (2013.01); H04N 13/0402 (2013.01); G06T 2207/10016 (2013.01)

(58) Field of Classification Search
  None
  See application file for complete search history.

(56) References Cited

U.S. PATENT DOCUMENTS

| 2009/0116732 A1* | 5/2009 | Zhou | H04N 13/0029 382/154 |
| 2011/0074818 A1* | 3/2011 | Masuda | G06T 7/0075 345/634 |

FOREIGN PATENT DOCUMENTS

| JP | 2006-012166 | 1/2006 |
| JP | 2009-123219 | 6/2009 |

* cited by examiner

Primary Examiner — Michelle Chin
(74) Attorney, Agent, or Firm — Paratus Law Group, PLLC

(57) ABSTRACT

There is provided an image processing device including a correction unit that searches for an approximate pixel which approximates an occlusion pixel in one parallax map between right-eye and left-eye parallax maps based on the other parallax map and calculates a correction parallax vector of the occlusion pixel based on a parallax vector of the approximate pixel.

12 Claims, 21 Drawing Sheets

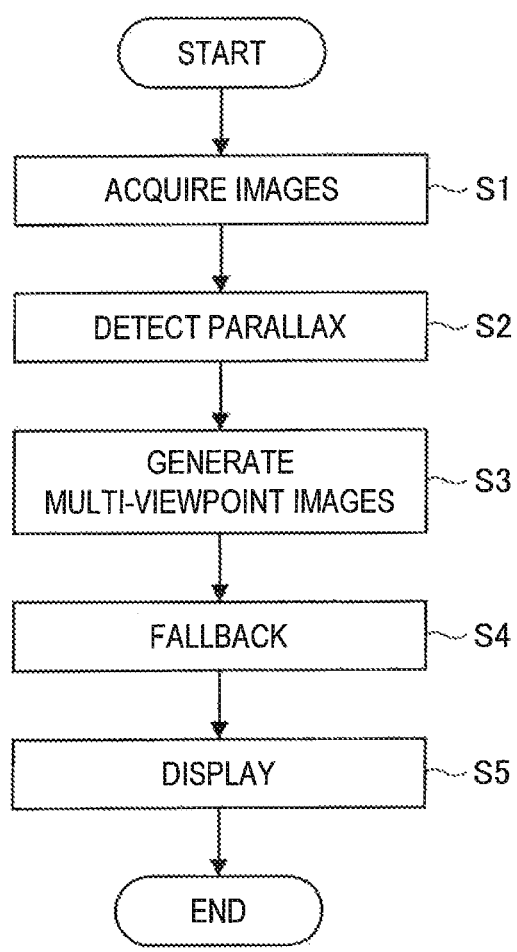

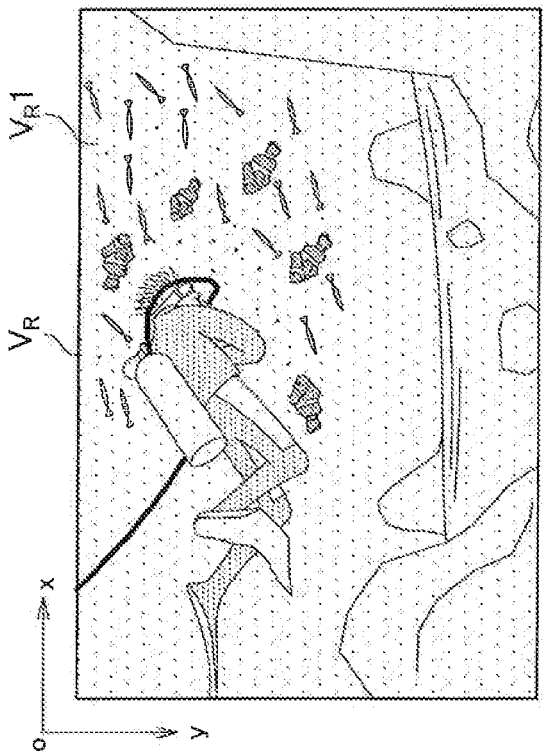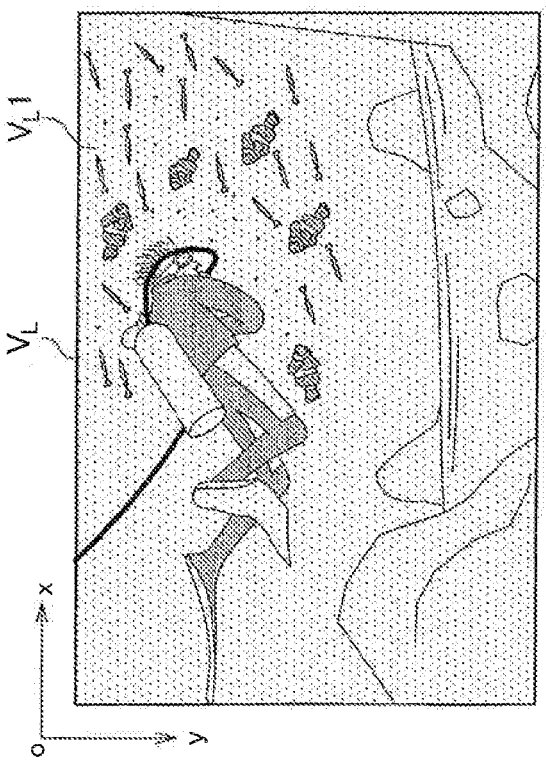

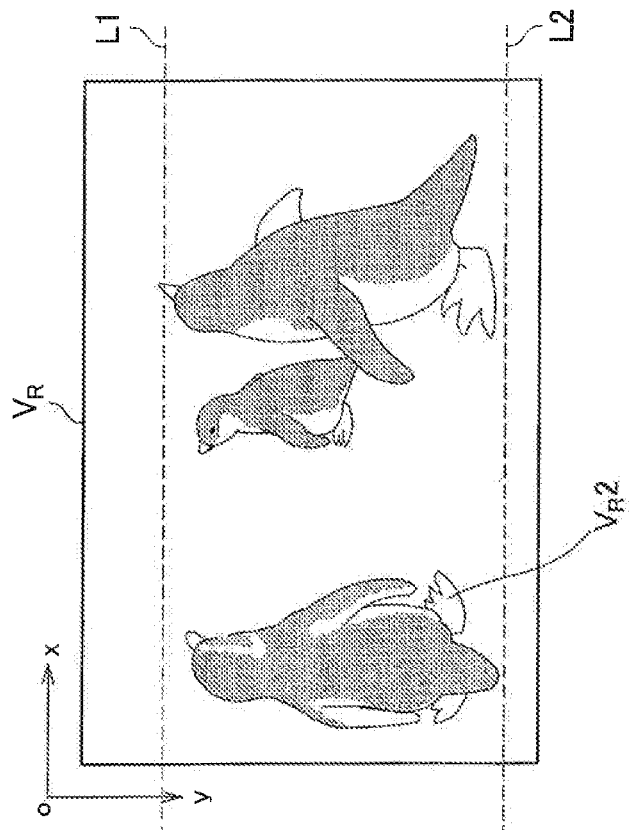
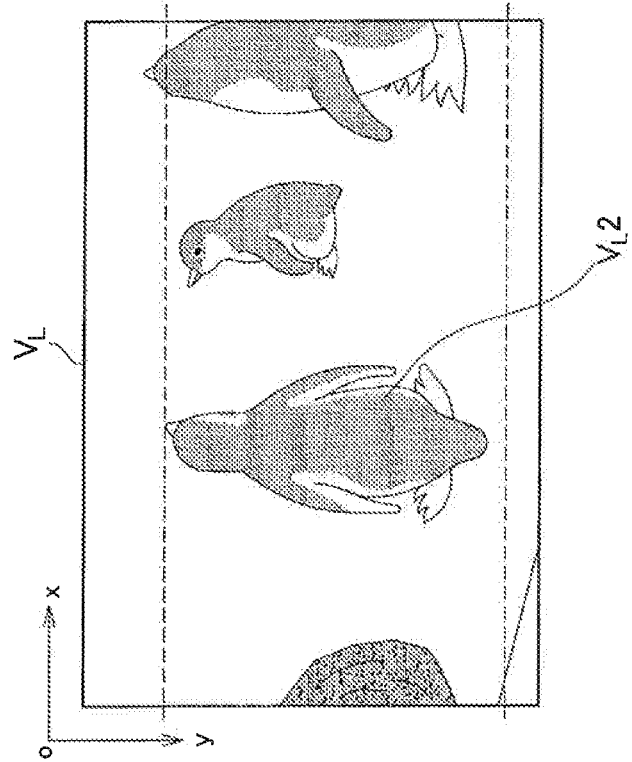

VERTICAL PARALLAX CANDIDATE STORAGE TABLE

| Δx | ... | −2 | −1 | 0 | 1 | 2 | ... |
|---|---|---|---|---|---|---|---|
| Δy | ... | 3 | −5 | 1 | −2 | 3 | ... |

FIG. 17

CORRECTION VALUE CORRESPONDENCE TABLE

| CLASS | CORRECTION VALUE $\alpha 1$ |
|---|---|
| 0 | 1.00 |
| 1 | 0.5 |
| 2 | 0.25 |
| 3 | 0.125 |
| 4 | 0.0 |

IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2012-224871 filed Oct. 10, 2012, the entire contents of which are incorporated herein by reference.

BACKGROUND

The present disclosure relates to an image processing device, an image processing method, and a program.

Japanese Unexamined Patent Application Publication Nos. 2009-123219 and 2006-12166 disclose technologies for dividing right-eye and left-eye images into a plurality of segments through color segmentation and setting parallax (depth) for each of the segments. According to these technologies, even when an occlusion region is present within a segment, parallax of the occlusion region can be interpolated using parallax of another pixel within the segment.

SUMMARY

However, the performance of these technologies largely depends on performance of the color segmentation. Moreover, the color segmentation is a very laborious process. For this reason, there is a demand for a technology capable of stabilizing a parallax (parallax vector) of an occlusion region more simply.

According to an embodiment of the present disclosure, there is provided an image processing device including a correction unit that searches for an approximate pixel which approximates an occlusion pixel in one parallax map between right-eye and left-eye parallax maps based on the other parallax map and calculates a correction parallax vector of the occlusion pixel based on a parallax vector of the approximate pixel.

According to an embodiment of the present disclosure, there is provided an image processing method including searching for an approximate pixel which approximates an occlusion pixel in one parallax map between right-eye and left-eye parallax maps based on the other parallax map and calculating a correction parallax vector of the occlusion pixel based on a parallax vector of the approximate pixel.

According to an embodiment of the present disclosure, there is provided a program causing a computer to realize a correction function of searching for an approximate pixel which approximates an occlusion pixel in one parallax map between right-eye and left-eye parallax maps based on the other parallax map and calculating a correction parallax vector of the occlusion pixel based on a parallax vector of the approximate pixel.

According to embodiments of the present disclosure, it is possible to search for an approximate pixel which approximates an occlusion pixel in one parallax map between right-eye and left-eye parallax maps based on the other parallax map and calculate a correction parallax vector of the occlusion pixel based on a parallax vector of the approximate pixel.

According to one or more of embodiments of the present disclosure, it is possible to stabilize a parallax vector of an occlusion region more simply.

BRIEF DESCRIPTION OF THE DRAWINGS

FIG. 1 is a flowchart illustrating an overview of a process performed by a naked-eye stereoscopic display device;

FIGS. 2A and 2B are diagrams illustrating a color deviation between input images;

FIGS. 3A and 3B are diagrams illustrating a geometric deviation between input images;

FIG. 17 is a diagram illustrating an example of a correction value correspondence table;

FIGS. 22A and 22B are diagrams illustrating a specific example of an occlusion region, a pulling vector, and the like;

DETAILED DESCRIPTION OF THE EMBODIMENTS

Figure 4:
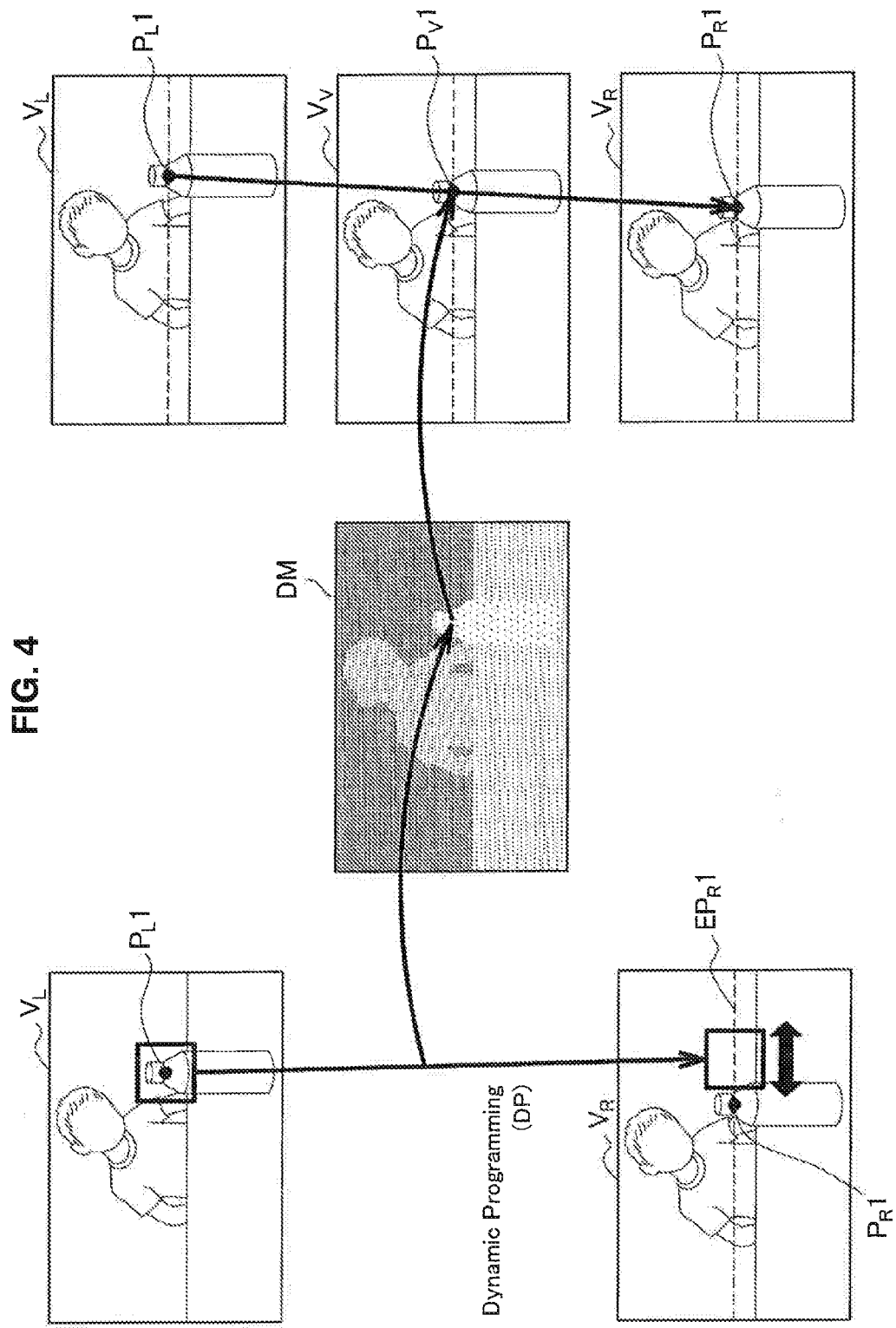
FIG. 4 is a diagram illustrating a state in which a parallax map (disparity map) and a multi-viewpoint image are generated.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.

1. Overview of process performed by naked-eye stereoscopic display device
2. Configuration of image processing device
3. Process performed by image processing device 4. Advantages of image processing device
5. Various modification examples

1. Overview of Process Performed by Naked-Eye Stereoscopic Display Device

The inventors of the present disclosure have repeatedly made thorough studies of a naked-eye stereoscopic display device capable of stereoscopically displaying an image without using dedicated stereoscopic glasses and through those studies have conceived an image processing device according to an embodiment. Here, the phrase "stereoscopically displaying" means that an image is stereoscopically displayed by causing binocular parallax for a viewer.

Accordingly, first, an overview of a process performed by the naked-eye stereoscopic display device including an image processing device will be described with reference to the flowchart of FIG. 1.

In step S1, the naked-eye stereoscopic display device acquires input images $V_L$ and $V_R$. Examples of the input images $V_L$ and $V_R$ are illustrated in FIGS. 2A and 2B and FIGS. 3A and 3B. In this embodiment, the pixels at the left upper ends of the input images $V_L$ and $V_R$ are assumed to be origin points. The horizontal direction is assumed to be the x axis and the vertical direction is assumed to be the y axis. The right direction is the positive direction of the x axis and the lower direction is the positive direction of the y axis. Each pixel includes coordinate information (x, y) and color information (luminance (brightness), saturation, and hue). Hereinafter, a pixel on the input image $V_L$ is referred to as a "left-side pixel" and a pixel on the input image $V_R$ is referred to as a "right-side pixel." In the following description, an example in which the input image $V_L$ is assumed to be a criterion image and the input image $V_R$ is assumed to be a reference image will mainly be described. However, of course, the input image $V_L$ may be assumed to be a reference image and the input image $V_R$ may be assumed to be a criterion image.

As illustrated in FIGS. 2A and 2B and FIGS. 3A and 3B, the same subjects (for example, the sea, fishes, and penguins) are depicted in the input images $V_L$ and $V_R$ at mutually different horizontal positions (x coordinates).

Here, a color deviation mutually occurs between the input images $V_L$ and $V_R$, as illustrated in FIGS. 2A and 2B in some cases. That is, the same subjects are depicted with different colors between the input images $V_L$ and $V_R$. For example, both of subject images $V_L1$ and $V_R1$ indicate the same sea, but differ from each other in color.

On the other hand, a geometric deviation mutually occurs between the input images $V_L$ and $V_R$ in some cases, as illustrated in FIGS. 3A and 3B. That is, the same subjects are depicted at different height positions (y axis). For example, both of subject images $V_L2$ and $V_R2$ indicate the same penguin, but the y coordinate of the subject image $V_L2$ is mutually different from the y coordinate of the subject image $V_R2$. In FIGS. 3A and 3B, a straight line L1 is depicted to facilitate the understanding of the geometric deviation. Accordingly, the naked-eye stereoscopic display device performs parallax detection corresponding to these deviations. That is, the naked-eye stereoscopic display device is capable of performing accurate parallax detection even when the naked-eye stereoscopic display device does not perform calibration on the color deviation or the geometric deviation.

In step S2, the naked-eye stereoscopic display device performs the parallax detection based on the input images $V_L$ and $V_R$. A state of the parallax detection is illustrated in FIG. 4.

As illustrated in FIG. 4, the naked-eye stereoscopic display device extracts a plurality of candidate pixels which are candidates of a correspondence pixel corresponding to a left-side pixel $P_L1$ from right-side pixels present in an epipolar line $EP_R1$ or at positions deviated from the epipolar line $EP_R1$ in the vertical direction (y direction). The epipolar line $EP_R1$ refers to a straight line that is depicted on the input image $V_R$, has the same y coordinate as the left-side pixel $P_L1$, and extends in the horizontal direction. Further, the naked-eye stereoscopic display device sets a correction value according to the color deviation between the input images $V_L$ and $V_R$ and extracts the candidate pixels based on the correction value. The correspondence pixel refers to a pixel that indicates the same subject as the left-side pixel $P_L1$.

The naked-eye stereoscopic display device extracts a right-side pixel $P_R1$ which is the correspondence pixel from the candidate pixels. The naked-eye stereoscopic display device sets a value obtained by subtracting the x coordinate of the left-side pixel $P_L1$ from the x coordinate of the right-side pixel $P_R1$ as horizontal parallax d1 and sets a value obtained by subtracting the y coordinate of the left-side pixel $P_L1$ from the y coordinate of the right-side pixel $P_R1$ as vertical parallax d2.

Thus, the naked-eye stereoscopic display device searches for not only pixels with the same y coordinate (vertical position) as the left-side pixel but also pixels with y coordinates different from that of the left-side pixel among the right-side pixels that are included in the input image $V_R$. Accordingly, the naked-eye stereoscopic display device can perform parallax detection corresponding to the color deviation and the geometric deviation.

The naked-eye stereoscopic display device generates a global parallax map (global disparity map) by detecting the horizontal parallax d1 and the vertical parallax d2 for all of the pixels on the input image $V_L$. Further, as will be described below, the naked-eye stereoscopic display device calculates horizontal parallax d1 and vertical parallax d2 of pixels that are included in the input image $V_L$ according to a method (that is, local matching) different from the above method (that is, the global matching). The naked-eye stereoscopic display device generates a local parallax map based on the horizontal parallax d1 and the vertical parallax d2 calculated through the local matching. Then, the naked-eye stereoscopic display device generates a unified parallax map by unifying these parallax maps. FIG. 4 illustrates a unified parallax map DM which is an example of the unified parallax map. In FIG. 4, the degree of horizontal parallax d1 is expressed by shading of hatching. Each parallax map includes a plurality of pixels and each pixel includes a parallax vector (which is a vector indicating horizontal parallax d2 and vertical parallax d2).

In the parallax map, since pixels other than occlusion pixels (which are pixels forming an occlusion region) are displayed (viewed) in both of the input images $V_L$ and $V_R$, the parallax vectors are matched. On the other hand, since the occlusion pixels are pixels that are displayed in one of the input images but are not displayed in the other input image, the parallax vectors are not matched.

Here, a matching property of the parallax vectors will be described with reference to FIGS. 22A and 22B. A left-side pixel $P_L10$ in an input image $V_L$ corresponds to a right-side pixel $P_R10$ in an input image $V_R$. That is, both of the left-side pixel $P_L10$ and the right-side pixel $P_R10$ indicate a beak portion of a subject image $V_L2$. In other words, the left-side pixel $P_L10$ is also displayed in the input image $V_R$.

Therefore, a parallax vector $V_L10$ of the left-side pixel $P_L10$ indicates the right-side pixel $P_R10$ in the input image $V_R$. That is, the coordinate values obtained by adding component values of the parallax vector $V_L10$ to the coordinate values of the left-side pixel $P_L10$ are identical with the coordinate values of the right-side pixel $P_R10$. Likewise, a parallax vector $V_R10$ of the right-side pixel $P_R10$ indicates the left-side pixel $P_L10$ in the input image $V_L$. Accordingly, the parallax vector $V_L10$ of the left-side pixel $P_L10$ is matched with the parallax vector $V_R10$ of the right-side pixel $P_R10$. Thus, the phrase "the parallax vectors are matched" means that the parallax vectors of two pixels indicate mutual pixels.

On the other hand, since a left-side pixel $P_L10$ is hidden behind a subject image $V_R3$ and thus is not seen in the input image $V_R$, the left-side pixel $P_L20$ is an occlusion pixel. That is, a correspondence pixel of the left-side pixel $P_L20$ is not present in a precise sense. However, the naked-eye stereoscopic display device sets a parallax vector by assuming a right-side pixel approximate to a left-side pixel to be a correspondence pixel, irrespective of whether the left-side pixel is an occlusion pixel.

Accordingly, a parallax vector $V_L20$ of the left-side pixel $P_L20$ indicates a right-side pixel $P_R30$ approximate to the left-side pixel $P_L20$. However, since the left-side pixel $P_L10$ and the right-side pixel $P_R30$ indicate different subjects, the parallax vector $V_R30$ of the right-side pixel $P_R30$ indicates a left-side pixel $P_L30$ different from the left-side pixel $P_L20$. Accordingly, the parallax vectors of the left-side pixel $P_L20$ and the right-side pixel $P_R30$ are not matched.

Thus, since the parallax vector is not matched in the occlusion pixel, the parallax vector of the occlusion pixel is very unstable temporally and spatially. As a result, in a multi-viewpoint image $V_V$ generated after step S3, for example, a phenomenon in which an image is disturbed in an occlusion region may occur. Accordingly, in the technologies disclosed in Japanese Unexamined Patent Application Publication Nos. 2009-123219 and 2006-12166, a parallax vector of an occlusion pixel is interpolated through color segmentation. However, in this method, performance of the interpolation depends on performance of the color segmentation. Further, the color segmentation itself is a very laborious process.

Accordingly, the naked-eye stereoscopic display device corrects (calculates) a parallax vector of an occlusion pixel as follows. That is, the naked-eye stereoscopic display device searches for an approximate pixel which approximates an occlusion pixel based on left-eye and right-eye parallax maps. Specifically, the naked-eye stereoscopic display device searches for a left-side pixel of which a parallax vector is matched by setting a left-side pixel of the occlusion pixel as a starting point and sequentially tracing (following) parallax vectors. The naked-eye stereoscopic display device sets the left-side pixel of which the parallax vector is matched as the approximate pixel and calculates a correction parallax vector of the occlusion pixel based on the parallax vector of the approximate pixel. The naked-eye stereoscopic display device substitutes the parallax vector of the occlusion pixel with the correction parallax vector. For example, the naked-eye stereoscopic display device sets the parallax vector of the approximate pixel as the correction parallax vector and substitutes the parallax vector of the occlusion pixel with the parallax vector of the approximate pixel (pulls the parallax vector of the approximate pixel to the occlusion pixel). The parallax vector of the approximate pixel is also referred to as a "pulling vector."

Figure 22B:
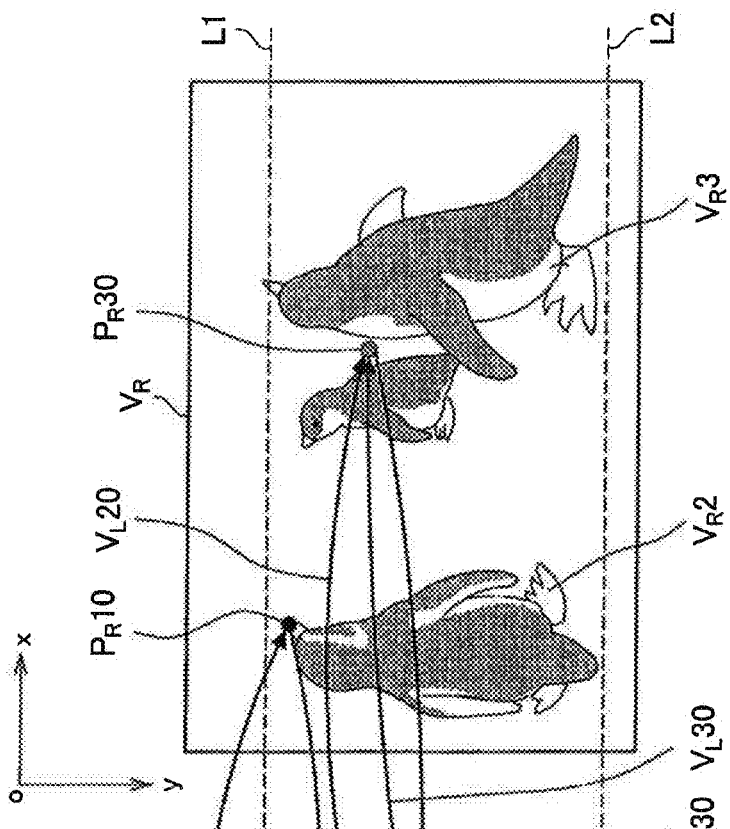
Figure 22A:
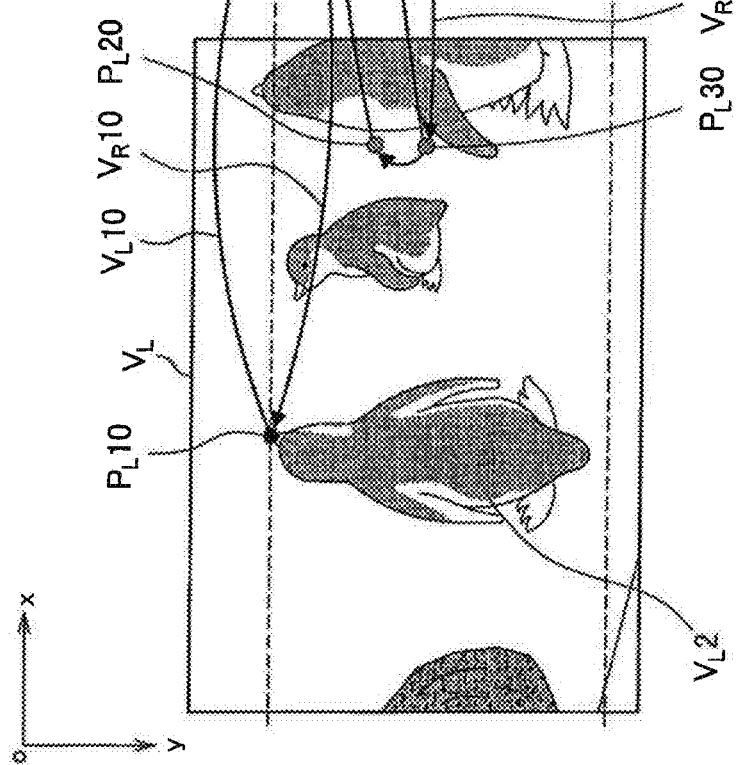

In the example illustrated in FIGS. 22A and 22B, since a parallax vector $V_L30$ of the left-side pixel $P_L30$ indicates a right-side pixel $P_R30$, the parallax vectors of the left-side pixel $P_L30$ and the right-side pixel $P_R30$ are matched with each other. Accordingly, the naked-eye stereoscopic display device calculates a correction parallax vector of the left-side pixel $P_L20$ based on a parallax vector $V_L30$. The naked-eye stereoscopic display device substitutes the parallax vector of the left-side pixel $P_L20$ with the correction parallax vector.

In step S3, the naked-eye stereoscopic display device generates the plurality of multi-viewpoint images $V_V$ based on the unified parallax map and the input images $V_L$ and $V_R$. For example, the multi-viewpoint image $V_V$ illustrated in FIG. 4 is an image used for interpolation between the input images $V_L$ and $V_R$. Accordingly, a pixel $P_V1$ corresponding to the left-side pixel $P_L1$ is present between the left-side pixel $P_L1$ and the right-side pixel $P_R1$.

Here, the multi-viewpoint images $V_V$ are images stereoscopically displayed by the naked-eye stereoscopic display device and correspond to different viewpoints (the positions of the eyes of a viewer). That is, the multi-viewpoint images $V_V$ viewed by the eyes of the viewer differ according to the positions of the eyes of the viewer. For example, since the right eye and the left eye of the viewer are present at different positions, the viewer views the mutually different multi-viewpoint images $V_V$. Thus, the viewer can stereoscopically view the multi-viewpoint images $V_V$. When the multi-viewpoint images $V_V$ corresponding to the viewpoints of the viewer are present in spite of the fact that these viewpoints are changed due to movement of the viewer, the viewer can stereoscopically view the multi-viewpoint images $V_V$. Thus, as the number of multi-viewpoint images $V_V$ is larger, the viewer can stereoscopically view the multi-viewpoint images $V_V$ at more positions. Further, as the number of multi-viewpoint images $V_V$ is larger, reverse view, that is, a phenomenon in which the viewer views the multi-viewpoint images $V_V$ which should originally be viewed with the right eye with the left eye, also rarely occurs. Motion parallax can be expressed by generating the plurality of multi-viewpoint images $V_V$.

In step S4, the naked-eye stereoscopic display device performs fallback (refinement). In a general sense, this process refers to a process of correcting each multi-viewpoint image $V_V$ again according to contents of the multi-viewpoint image. In step S5, the naked-eye stereoscopic display device stereoscopically displays each multi-viewpoint image $V_V$.

2. Configuration of Image Processing Device

Figure 5:
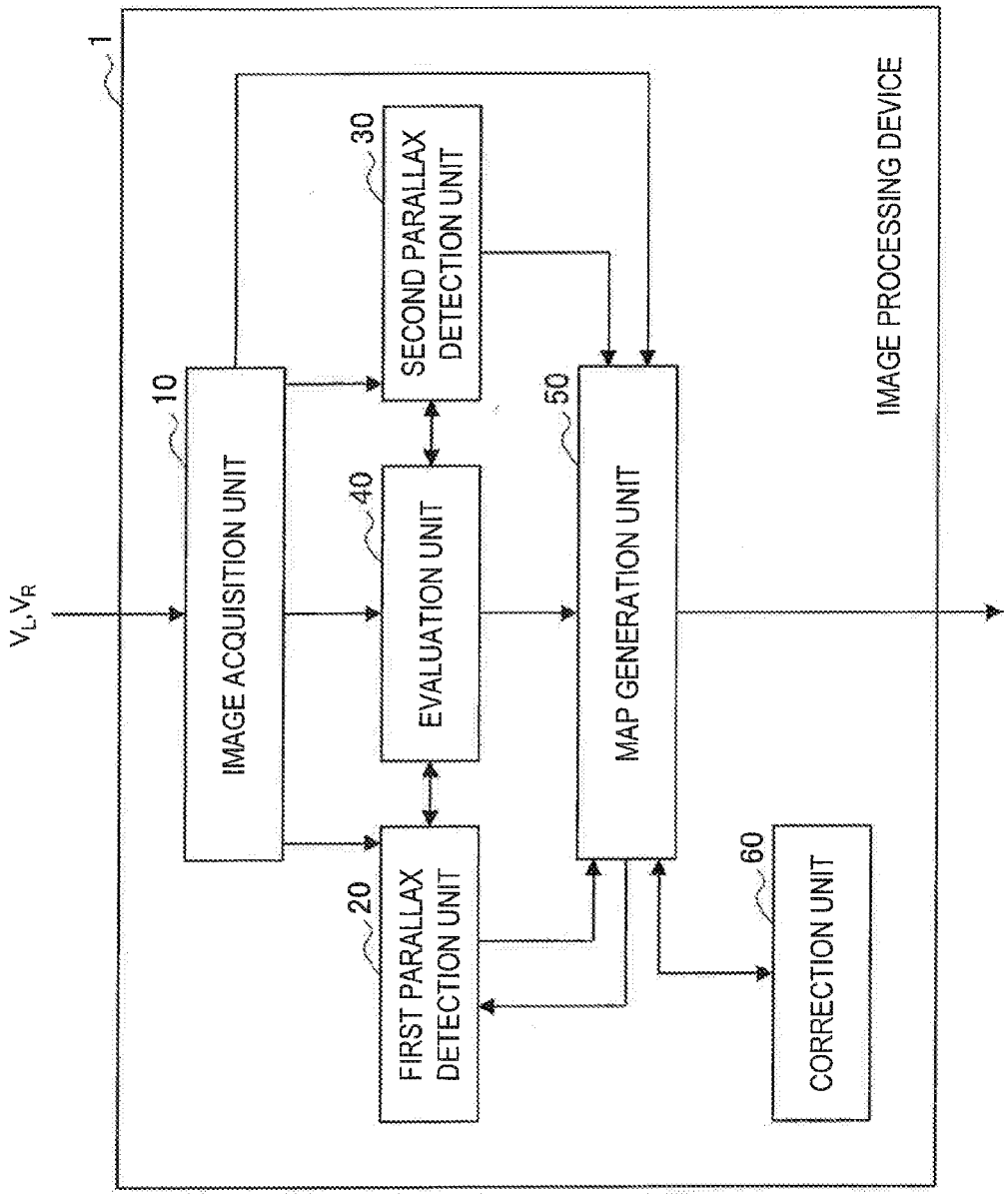
FIG. 5 is a block diagram illustrating the configuration of an image processing device according to an embodiment of the present disclosure.

Next, the configuration of an image processing device 1 according to this embodiment will be described with reference to the drawings. As illustrated in FIG. 5, the image processing device 1 includes an image acquisition unit 10, a first parallax detection unit 20, a second parallax detection unit 30, an evaluation unit 40, a map generation unit (correction value calculation unit) 50, and a correction unit 60. That is, the image processing device 1 has a hardware configuration of a CPU, a ROM, a RAM, a hard disk, and the like and the above-described constituent elements are realized by the hardware configuration. That is, in the image processing device 1, programs executed to realize the image acquisition unit 10, the first parallax detection unit 20, the second parallax detection unit 30, the evaluation unit 40, the map generation unit 50, and the correction unit 60 are stored in the ROM. The image processing device 1 is a device that performs the processes of step S1 and step S2 described above.

The image processing device 1 generally performs the following process. That is, the image acquisition unit 10 acquires input images $V_L$ and $V_R$ and outputs the input images $V_L$ and $V_R$ to each constituent element of the image processing device 1. The first parallax detection unit 20 detects horizontal parallax d1 and vertical parallax d2 for each of left-side pixels included in the input image $V_L$ by performing the global matching on the input images $V_L$ and $V_R$. On the other hand, the second parallax detection unit 30 detects the horizontal parallax d1 and the vertical parallax d2 for each of left-side pixels included in the input image $V_L$ by performing the local matching on the input images $V_L$ and $V_R$.

That is, the image processing device 1 performs the global matching and the local matching concurrently. Here, the local matching has the advantage that whether accuracy is good does not depend on quality (the degree of color deviation, geometric deviation, or the like) of the input images $V_L$ and $V_R$, but has the disadvantage of being weak in occlusion and poor in stability (accuracy easily varies). On the other hand, the global matching has the advantage of being strong in occlusion and stable, but has the disadvantage that whether accuracy is good depends heavily on the quality of the input images $V_L$ and $V_R$. Accordingly, the image processing device 1 is configured to perform both of the global matching and the local matching concurrently, compare parallax maps obtained as results for each pixel, and unify the parallax maps.

(Configuration of Image Acquisition Unit)

The image acquisition unit 10 acquires the input images $V_L$ and $V_R$ and outputs the input images $V_L$ and $V_R$ to each constituent element in the image processing device 1. The image acquisition unit 10 may acquire the input images $V_L$ and $V_R$ from a memory in the naked-eye stereoscopic display device or may acquire the input images $V_L$ and $V_R$ by communicating with another device. In this embodiment, a "current frame" means a frame which is currently being processed by the image processing device 1. A "previous frame" means a frame immediately before the current frame. A "subsequent frame" means a frame immediately after the current frame. When no particular frame is instructed to be processed by the image processing device 1, the image processing device 1 is assumed to perform processing on the current frame.

(Configuration of First Parallax Detection Unit)

Figure 6:
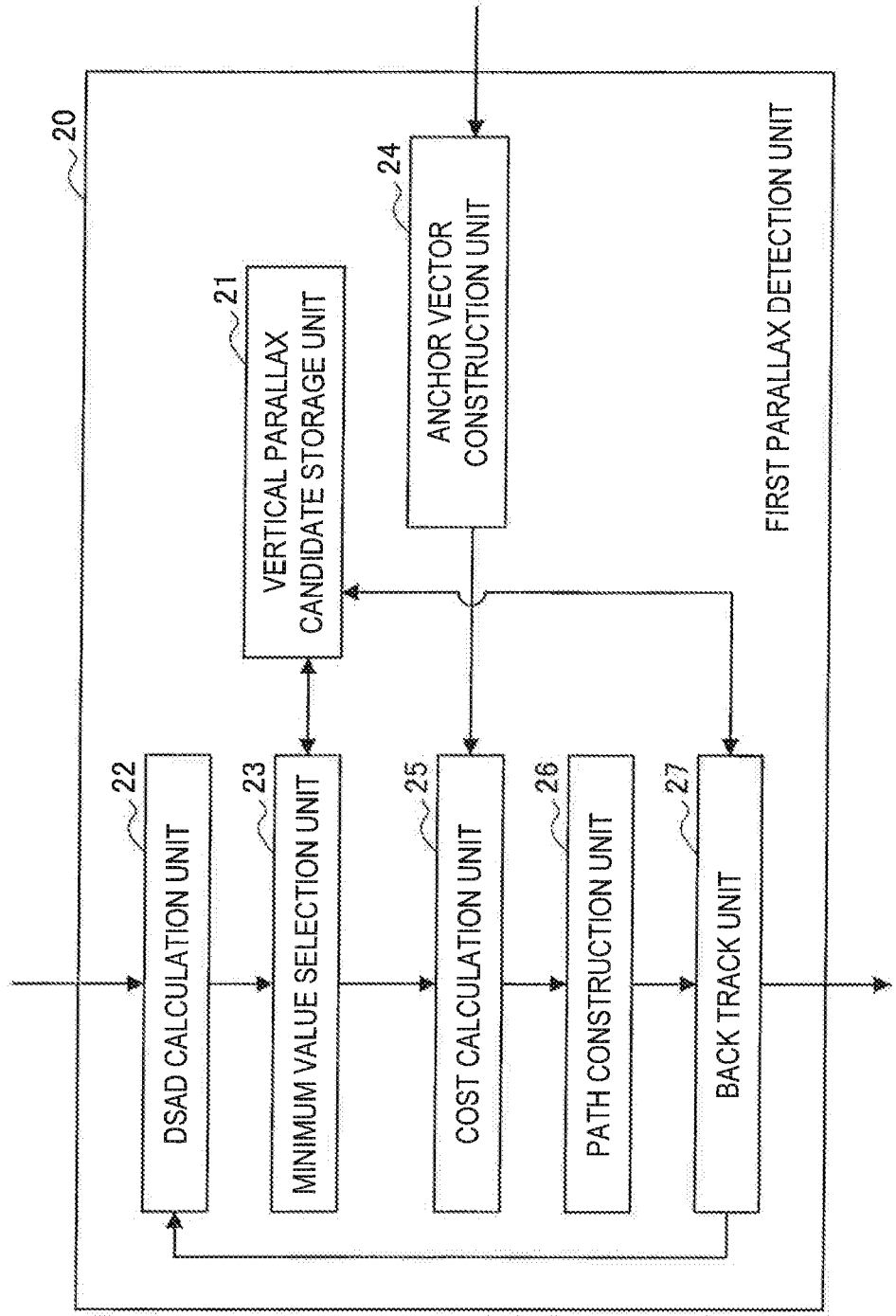
FIG. 6 is a block diagram illustrating the configuration of a first parallax detection unit.

As illustrated in FIG. 6, the first parallax detection unit 20 includes a vertical parallax candidate storage unit 21, a dynamic sum-of-absolute difference (DSAD) calculation unit 22, a minimum value selection unit 23, an anchor vector construction unit 24, a cost calculation unit 25, a path construction unit 26, and a back track unit 27.

(Configuration of Vertical Parallax Candidate Storage Unit)

Figures 7, 8:
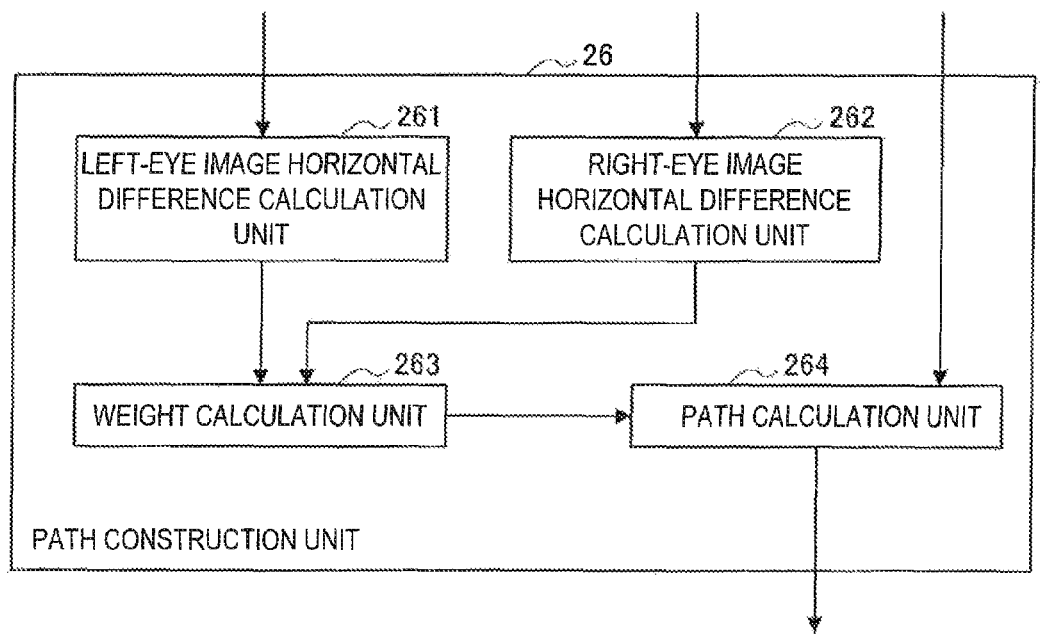
FIG. 7 is a diagram illustrating an example of a vertical parallax candidate storage table.
FIG. 8 is a diagram illustrating the configuration of a path construction unit.

The vertical parallax candidate storage unit 21 stores a vertical parallax candidate storage table illustrated in FIG. 7. In the vertical parallax candidate storage table, horizontal parallax candidates $\Delta x$ and vertical parallax candidates $\Delta y$ are recorded in association therewith. The horizontal parallax candidate $\Delta x$ indicates a value obtained by subtracting the x coordinate of a left-side pixel from the x coordinate of a candidate pixel. On the other hand, the vertical parallax candidate $\Delta y$ indicates a value obtained by subtracting the y coordinate of a left-side pixel from the y coordinate of a candidate pixel. The details will be described below. The vertical parallax candidate storage table is prepared for each left-side pixel.

(Configuration of DSAD Calculation Unit)

The DSAD calculation unit 22 acquires correction value information regarding a correction value $\alpha 1$ from the map generation unit 50. Here, in a general sense, the correction value $\alpha 1$ is set according to the degree of color deviation between the input images $V_L$ and $V_R$ of a previous frame. The larger the color deviation is, the smaller the correction value $\alpha 1$ is. When no correction value information is acquired (for example, a process is performed on the initial frame ($0^{th}$ frame)), the DSAD calculation unit 22 sets the correction value $\alpha 1$ to 0.

The DSAD calculation unit 22 sets one left-side pixel as a criterion pixel and acquires the global parallax map of the previous frame from the back track unit 27. Then, the DSAD calculation unit 22 searches for the horizontal parallax d1 and the vertical parallax d2 of the previous frame of the criterion pixel from the global parallax map of the previous frame. Then, the DSAD calculation unit 22 sets, as a $1^{st}$ reference pixel, one right-side pixel with the vertical parallax d2 of the previous frame of the criterion pixel, that is, one right-side pixel with the y coordinate obtained by adding the vertical parallax d2 of the previous frame to the y coordinate of the criterion pixel. Thus, the DSAD calculation unit 22 determines the $1^{st}$ reference pixel based on the global parallax map of the previous frame. That is, the DSAD calculation unit 22 performs a recursive process. When the global parallax map of the previous frame may not be acquired, the DSAD calculation unit 22 sets a right-side pixel having the same y coordinate as the criterion pixel as the $1^{st}$ reference pixel.

The DSAD calculation unit 22 sets right-side pixels present within a predetermined range of the $1^{st}$ reference pixel in the y direction as $2^{nd}$ reference pixels. The predetermined range is, for example, a range of ±1 centering on the y coordinate of the $1^{st}$ reference pixel. However, this range may be changed arbitrarily according to a balance of robustness and accuracy. A pixel group formed from the $1^{st}$ and $2^{nd}$ reference pixels is configured as a reference pixel group.

Thus, the y coordinate of the $1^{st}$ reference pixel is sequentially updated as the frame progresses. Therefore, a pixel closer to a pixel (close to the criterion pixel) closer to a correct pixel is selected as the $1^{st}$ reference pixel. Since the reference pixel group is set using the updated $1^{st}$ reference pixel as a criterion, a searching range in the y direction substantially expands. For example, when the y coordinate of the $1^{st}$ reference pixel in the $0^{th}$ frame is 5, the y coordinates of the $2^{nd}$ reference pixels become 4 and 6. Thereafter, when the y coordinate of the $1^{st}$ reference pixel in the $1^{st}$ frame is updated to 6, the y coordinates of the $2^{nd}$ reference pixels become 5 and 7. In this case, while the y coordinate of the $1^{st}$ reference pixel in the $0^{th}$ frame is 5, the y coordinates of the $2^{nd}$ reference pixels are increased up to 7 as the frame progresses from the $0^{th}$ frame to the $1^{st}$ frame. That is, the searching range in the y direction substantially expands by 1 in the positive direction. Thus, the image processing device 1 can perform the parallax detection strong in the geometric deviation. The DSAD calculation unit 22 uses the global parallax map of the previous frame when determining the $1^{st}$ reference pixel. However, the unified parallax map of the previous frame may be used. In this case, the DSAD calculation unit 22 can determine the $1^{st}$ reference pixel with more accuracy.

The DSAD calculation unit 22 calculates DSAD (Δx, j) (1$^{st}$ and 2$^{nd}$ evaluation values) expressed in the following Equation (1) based on the criterion pixel, the reference pixel group including the 1$^{st}$ and 2$^{nd}$ reference pixels, and the correction value α1.

$$DSAD(\Delta x,\ j) = \sum_i |(L(i) - R(i,\ j)) - (L(0) - R(0,\ j)) \times (1 - \alpha 1)| \quad (1)$$

In the equation, Δx is a value obtained by subtracting the x coordinate of the criterion pixel from the x coordinate of the 1$^{st}$ reference pixel. As will be described below, the minimum DSAD(Δx, j) is selected for each Δx and a right-side pixel corresponding to the minimum DSAD(Δx, j) is considered as a candidate pixel. Accordingly, Δx is also a value obtained by subtracting the x coordinate of the criterion pixel from the x coordinate of a candidate pixel, that is, a horizontal parallax candidate. Further, j is an integer of −1 to +1 and i is an integer of −2 to 2. L(i) is luminance of a left-side pixel with a y coordinate different by i from the y coordinate of the criterion pixel. That is, L(i) indicates a criterion pixel characteristic amount within a criterion region centering on the criterion pixel. R(i, 0) indicates a 1$^{st}$ reference pixel characteristic amount within a 1$^{st}$ reference region centering on the 1$^{st}$ reference pixel. Accordingly, DSAD(Δx, 0) indicates a value used to evaluate a difference between the criterion pixel characteristic amount and the 1$^{st}$ reference pixel characteristic amount, that is, a 1$^{st}$ evaluation value.

On the other hand, R(i, 1) and R(i, −1) indicate 1$^{st}$ reference pixel characteristic amounts in 2$^{nd}$ reference regions centering on the 2$^{nd}$ reference pixels. Accordingly, DSAD(Δx, 1) and DSAD(Δx, −1) indicate values used to evaluate differences between the criterion pixel characteristic amount and the 2$^{nd}$ reference pixel characteristic amounts, that is, 2$^{nd}$ evaluation values. Further, α is the above-described correction value.

Accordingly, the DSAD calculation unit 22 calculates DSAD, referring to not only the luminances of the criterion pixel and the 1$^{st}$ and 2$^{nd}$ reference pixels but also the luminances of pixels deviated in the y direction from these pixels. That is, the DSAD calculation unit 22 refers to the luminances of the peripheries of the criterion pixel and the 1$^{st}$ and 2$^{nd}$ reference pixels by shifting the y coordinates of the criterion pixel and the 1$^{st}$ and 2$^{nd}$ reference pixels. Accordingly, even from this viewpoint, the image processing device 1 can perform the parallax detection strong in the geometric deviation. In the above-described process, an amount of shift of the y coordinate is set to 2 pixels vertically in the y coordinate of each pixel, but this range is changed arbitrarily according to the balance of the robustness and the accuracy. The DSAD calculation unit 22 can perform the parallax detection strong in the color deviation, since the correction value according to the color deviation is used for the calculation of the DSAD.

The DSAD calculation unit 22 calculates DSAD(Δx, j) for all of the horizontal parallax candidates Δx. That is, the DSAD calculation unit 22 generates a reference pixel group for each of the 1$^{st}$ reference pixels different in a horizontal position and calculates DSAD(Δx, j) for each reference pixel group. The DSAD calculation unit 22 changes the criterion pixel and repeats the above-described process. Thus, the DSAD calculation unit 22 calculates DSAD(Δx, j) for all of the criterion pixels. Then, the DSAD calculation unit 22 generates DSAD information used to associate DSAD(Δx, j) with the criterion pixels and outputs the DSAD information to the minimum value selection unit 23.

(Configuration of Minimum Value Selection Unit)

Figure 9:
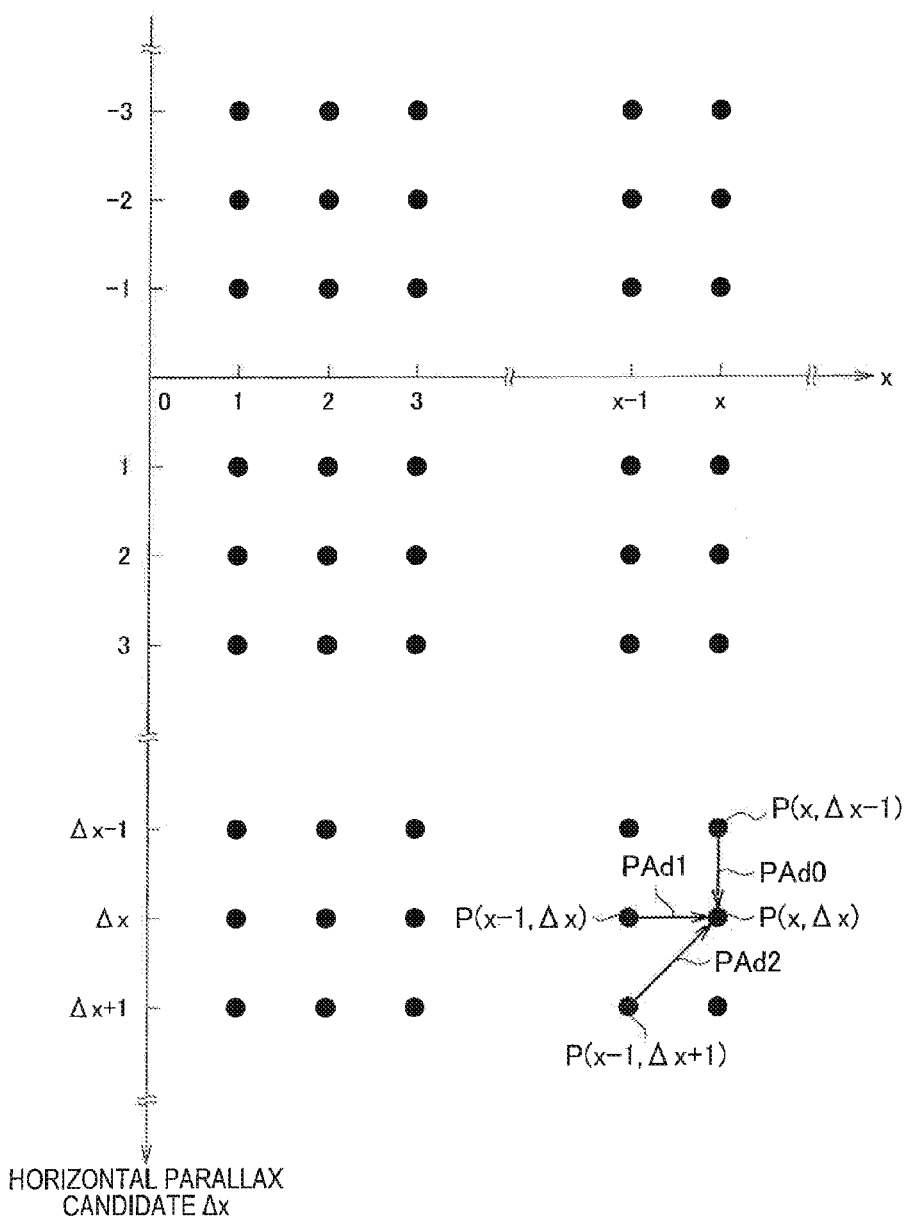
FIG. 9 is a diagram illustrating a DP map used to perform parallax matching.

The minimum value selection unit 23 performs the following process based on the DSAD information. That is, the minimum value selection unit 23 selects the minimum DSAD(Δx, j) for each horizontal parallax candidate Δx. The minimum value selection unit 23 stores the selected DSAD (Δx, j) in each node P (x, Δx) of a DP map for parallax detection illustrated in FIG. 9. Accordingly, the minimum DSAD(Δx, j) becomes a score of the node P (x, Δx).

In the DP map for parallax detection, the horizontal axis represents the x coordinates of the left-side pixels and the vertical axis represents the horizontal parallax candidates Δx. Thus, the DP map for parallax detection has the plurality of nodes P (x, Δx). The DP map for parallax detection is used when the horizontal parallax d1 of the left-side pixel is calculated. The DP map for parallax detection is generated for each of the y coordinates of the left-side pixels. Accordingly, one node P (x, Δx) within one DP map for parallax detection corresponds to one left-side pixel.

The minimum value selection unit 23 specifies a reference pixel corresponding to the minimum DSAD(Δx, j) as a candidate pixel. The minimum value selection unit 23 sets a value obtained by subtracting the y coordinate of the criterion pixel from the y coordinate of the candidate pixel as a vertical parallax candidate Δy. Then, the minimum value selection unit 23 stores the horizontal parallax candidate Δx and the vertical parallax candidate Δy in the vertical parallax candidate storage table in association therewith. The minimum value selection unit 23 performs the above-described process on all of the criterion pixels.

(Configuration of Anchor Vector Construction Unit)

The anchor vector construction unit 24 illustrated in FIG. 6 acquires a temporal confidence degree map of the previous frame from the evaluation unit 40 and acquires the unified parallax map of the previous frame from the map generation unit 50. A temporal confidence degree map of a current frame is a map indicating whether the horizontal parallax d1 and the vertical parallax d2 of each left-side pixel indicated by the unified parallax map of the current frame can also be referred to in a subsequent frame. Accordingly, the temporal confidence degree map of the previous frame indicates, for each left-side pixel, whether the horizontal parallax d1 and the vertical parallax d2 detected in the previous frame can also be referred to in the current frame. Based on the temporal confidence degree map of the previous frame, the anchor vector construction unit 24 specifies the left-side pixel for which the horizontal parallax d1 and the vertical parallax d2 can be referred to in the current frame, that is, a parallax-stable left-side pixel. Then, based on the unified parallax map of the previous frame, the anchor vector construction unit 24 specifies the horizontal parallax d1 of the previous frame of the parallax-stable left-side pixel, that is, a stable horizontal parallax dr. Then, the anchor vector construction unit 24 generates an anchor vector expressed in, for example, the following Equation (2) for each parallax-stable left-side pixel.

$$\text{Anchor} = \alpha 2 \times (0 \ldots 1\ 0 \ldots 0) = \alpha 2 \times M_d \quad (2)$$

In the equation, α2 indicates a bonus value, a matrix $M_d$ indicates the horizontal parallax d1 of the previous frame of the parallax-stable left-side pixel. That is, each column of the matrix $M_d$ indicates a different horizontal parallax candidate Δx and a column with components of 1 indicates that the vertical parallax candidate Δx corresponding to this column is the stable horizontal parallax d1'. When there is no parallax-stable left-side pixel, all of the components of the matrix $M_d$ are 0. The anchor vector construction unit 24 sets all of the components of the matrix $M_d$ to 0 when the temporal confidence degree map and the unified parallax map of the previous frame may not be acquired (for example, the process is performed on the $0^{th}$ frame). The anchor vector construction unit 24 generates anchor vector information used to associate the anchor vector with the parallax-stable left-side pixel and outputs the anchor vector information to the cost calculation unit 25.

(Configuration of Cost Calculation Unit)

The cost calculation unit 25 illustrated in FIG. 6 updates the value of each node P (x, d) of the DP map for parallax detection based on the anchor vector information. That is, the cost calculation unit 25 specifies a node (x, Δx (=d1')) corresponding to the stable horizontal parallax d1' for each parallax-stable left-side pixel and subtracts the bonus value α2 from the score of this node. Thus, the node with the same parallax as the stable horizontal parallax d1' easily forms the shortest path. In other words, the stable horizontal parallax d1' is easily selected also in the current frame.

(Configuration of Path Construction Unit)

As illustrated in FIG. 8, the path construction unit 26 illustrated in FIG. 6 includes a left-eye image horizontal difference calculation unit 261, a right-eye image horizontal difference calculation unit 262, a weight calculation unit 263, and a path calculation unit 264.

The left-eye image horizontal difference calculation unit 261 acquires the input image $V_L$ from the image acquisition unit 10 and performs the following process on each of the left-side pixels included in the input image $V_L$. That is, the left-eye image horizontal difference calculation unit 261 sets one left-side pixel as a criterion pixel and subtracts the luminance of a left-side pixel with an x coordinate 1 larger than the x coordinate of the criterion pixel from the luminance of the criterion pixel. The left-eye image horizontal difference calculation unit 261 sets a value obtained in this way as a luminance horizontal difference $dw_L$ and generates luminance horizontal difference information regarding the luminance horizontal difference $dw_L$. Then, the left-eye image horizontal difference calculation unit 261 outputs the luminance horizontal difference information to the weight calculation unit 263.

The right-eye image horizontal difference calculation unit 262 acquires the input image $V_R$ from the image acquisition unit 10. The right-eye image horizontal difference calculation unit 262 performs the same process as the left-eye image horizontal difference calculation unit 261 described above on the input image $V_R$. Then, the right-eye image horizontal difference calculation unit 262 outputs luminance horizontal difference information generated through this process to the weight calculation unit 263.

Based on the luminance horizontal difference information, the weight calculation unit 263 calculates weights $wt_L$ of all of the left-side pixels and weights $wt_R$ of all of the right-side pixels. Specifically, the weight calculation unit 263 normalizes the luminance horizontal difference $dw_L$ to a value of 0 to 1 by substituting the luminance horizontal difference $dw_L$ of the left-side pixel to a sigmoid function and sets this value as the weight $wt_L$. Likewise, the weight calculation unit 263 normalizes the luminance horizontal difference $dw_R$ to a value of 0 to 1 by substituting the luminance horizontal difference $dw_R$ of the right-side pixel to a sigmoid function and sets this value as the weight $wt_R$. Then, the weight calculation unit 263 generates weight information regarding the calculated weights $wt_L$ and $wt_R$ and outputs the weight information to the path calculation unit 264. The weights $wt_L$ and $wt_R$ decrease in edge (contour) portions of an image and increase in flat portions. For example, the sigmoid function is given in the following Equation (2-1).

$$f(x) = \frac{1}{1 + e^{-kx}} \qquad (2\text{-}1)$$

where k is a gain.

The path calculation unit 264 calculates an accumulated cost from the starting point of the DP map for parallax detection to each node P (x, Δx) based on the weight information given from the weight calculation unit 263. Specifically, the path calculation unit 264 sets a node (0, 0) and a node ($x_{max}$, 0) as a starting point and an ending point, respectively, and defines the accumulated cost from the starting point to a node P (x, Δx) as follows. Here, $x_{max}$ is the maximum value of the x coordinate of the left-side pixel.

$$DFI(x,\Delta x)_0 = DFI(x,\Delta x-1) + occCost_0 + occCost_1 \times wt_R \qquad (3)$$

$$DFI(x,\Delta x)_1 = DFI(x-1,\Delta x) + DFD(x,d) \qquad (4)$$

$$DFI(x,\Delta x)_2 = DFI(x-1,\Delta x+1) + occCost_0 + occCost_2 \times wt_L \qquad (5)$$

In the equations, $DFI(x, \Delta x)_0$ is an accumulated cost up to the node P (x, Δx) via a path $PA_d0$, $DFI(x, \Delta x)_1$ is an accumulated cost up to the node P (x, Δx) via a path $PA_d1$, and $DFI(x, \Delta x)_2$ is an accumulated cost up to the node P (x, Δx) via a path $PA_d2$. DFI(x, Δx−1) is an accumulated cost from the starting point to a node P (x, Δx−1). DFI(x−1, Δx) is an accumulated cost from the starting point to a node P (x−1, Δx), DFI(x−1, Δx+1) is an accumulated cost from the starting point to a node P(x−1, Δx+1). Further, occ $Cost_0$ and occ $Cost_1$ are predetermined values indicating the values of costs and are, for example, 4.0. Furthermore, $wt_L$ is a weight of the left-side pixel corresponding to the node P (x, Δx) and $wt_R$ is a weight of the right-side pixel with the same coordinates as this left-side pixel.

The path calculation unit 264 selects the minimum cost from the calculated accumulated costs $DFI(x, \Delta x)_0$ to $DFI(x, \Delta x)_2$ and sets the selected cost as the accumulated cost DFI(x, Δx) of the node P (x, Δx). The path calculation unit 264 calculates the accumulated costs DFI(x, Δx) for all of the nodes P (x, Δx) and stores the accumulated costs DFI(x, Δx) in the DP map for parallax detection.

The hack track unit 27 calculates a shortest path, that is, a path with the minimum accumulated cost from the starting point to the ending point, by tracking a path with the minimum accumulated cost backward from the ending point to the starting point. A node on the shortest path becomes the horizontal parallax d1 of the left-side pixel corresponding to this node. Accordingly, the back track unit 27 detects the horizontal parallax d1 of each left-side pixel by calculating the shortest path.

The back track unit 27 acquires the vertical parallax candidate storage table corresponding to one left-side pixel from the vertical parallax candidate storage unit 21. The back track unit 27 specifies the vertical parallax candidate Δy corresponding to the horizontal parallax d1 of the left-side pixel based on the acquired vertical parallax candidate storage table and sets the specified vertical parallax candidate Δy as the vertical parallax d2 of the left-side pixel. Thus, the back track unit 27 detects the vertical parallax d2. The back track unit 27 detects the vertical parallax d2 of all of the left-side pixels and generates a global parallax map based on the detected horizontal parallax d1 and the detected vertical parallax d2. The global parallax map indicates the horizontal parallax d1 and the vertical parallax d2 (that is, a parallax vector) for each left-side pixel. The back track unit 27 outputs the generated global parallax map to the DSAD calculation unit 22, and the evaluation unit 40 and the map generation unit 50 illustrated in FIG. 5. The global parallax map output to the DSAD calculation unit 22 is used in the subsequent frame.

(Configuration of Second Parallax Detection Unit)

The second parallax detection unit 30 illustrated in FIG. 5 calculates the horizontal parallax d1 and the vertical parallax d2 of each left-side pixel by a method different from the method of the $1^{st}$ parallax detection unit, that is, the local matching. Specifically, the second parallax detection unit 30 performs the following process. The second parallax detection unit 30 acquires the input images $V_L$ and $V_R$ from the image acquisition unit 10. Further, the second parallax detection unit 30 acquires the temporal confidence degree map of a previous frame from the evaluation unit 40 and acquires the unified parallax map of the previous frame from the map generation unit 50.

Based on the temporal confidence degree map of the previous frame, the second parallax detection unit 30 specifies the left-side pixel for which the horizontal parallax d1 and the vertical parallax d2 can be referred to in the current frame, that is, a parallax-stable left-side pixel. Then, based on the unified parallax map of the previous frame, the second parallax detection unit 30 specifies the horizontal parallax d1 and the vertical parallax d2 of the previous frame of the parallax-stable left-side pixel, that is, a stable horizontal parallax d1' and a stable vertical parallax d2'. Then, the anchor vector construction unit 24 adds the stable horizontal parallax d1' and the stable vertical parallax d2' to the xy coordinates of the parallax-stable left-side pixel, respectively, and sets a right-side pixel with the xy coordinates obtained in this way as a parallax-stable right-side pixel.

The second parallax detection unit 30 divides each of the input images $V_L$ and $V_R$ into a plurality of pixel blocks. For example, the second parallax detection unit 30 divides the input image $V_L$ into 64 left-side pixel blocks and divides the input image $V_R$ into 64 right-side pixel blocks.

The second parallax detection unit 30 detects a correspondence pixel corresponding to each left-side pixel in the left-side pixel block from the right-side pixel block corresponding to the left-side pixel block. For example, the second parallax detection unit 30 detects the right-side pixel with luminance closest to the luminance of the left-side pixel as the correspondence pixel. Here, the second parallax detection unit 30 preferentially detects the parallax-stable right-side pixel as the correspondence pixel when detecting the correspondence pixel corresponding to the parallax-stable left-side pixel. For example, when the right-side pixel with luminance closest to the luminance of the left-side pixel becomes the parallax-stable right-side pixel, the second parallax detection unit 30 detects the parallax-stable right-side pixel as the correspondence pixel. On the other hand, when the right-side pixel with luminance closest to the luminance of the left-side pixel becomes the right-side pixel other than the parallax-stable right-side pixel, the second parallax detection unit 30 compares a luminance difference and a predetermined luminance range between the right-side pixel and the parallax-stable left-side pixel. When the luminance difference is within the predetermined luminance range, the second parallax detection unit 30 detects the right-side pixel as the correspondence pixel. When the luminance difference is outside of the predetermined luminance range, the second parallax detection unit 30 detects the parallax-stable right-side pixel as the correspondence pixel.

The second parallax detection unit 30 sets a value obtained by subtracting the x coordinate of the left-side pixel from the x coordinate of the correspondence pixel as the horizontal parallax d1 of the left-side pixel and sets a value obtained by subtracting the y coordinate of the left-side pixel from the y coordinate of the correspondence pixel as the vertical parallax d2 of the left-side pixel. Based on the detection result, the second parallax detection unit 30 generates a local parallax map. The local parallax map indicates the horizontal parallax d1 and the vertical parallax d2 (that is, a parallax vector) for each left-side pixel. The second parallax detection unit 30 outputs the generated local parallax map to the evaluation unit 40 and the map generation unit 50.

The second parallax detection unit 30 does not detect the parallax-stable left-side pixel and performs the above-described process when the temporal confidence degree map and the unified parallax map of the previous frame may not be acquired (for example, the process is performed on the $0^{th}$ frame). The second parallax detection unit 30 may detect the horizontal parallax d1 and the vertical parallax d2 of the left-side pixel by performing the same process as the first parallax detection unit 20 described above on each left-side pixel block.

(Configuration of Evaluation Unit)

Figure 10:
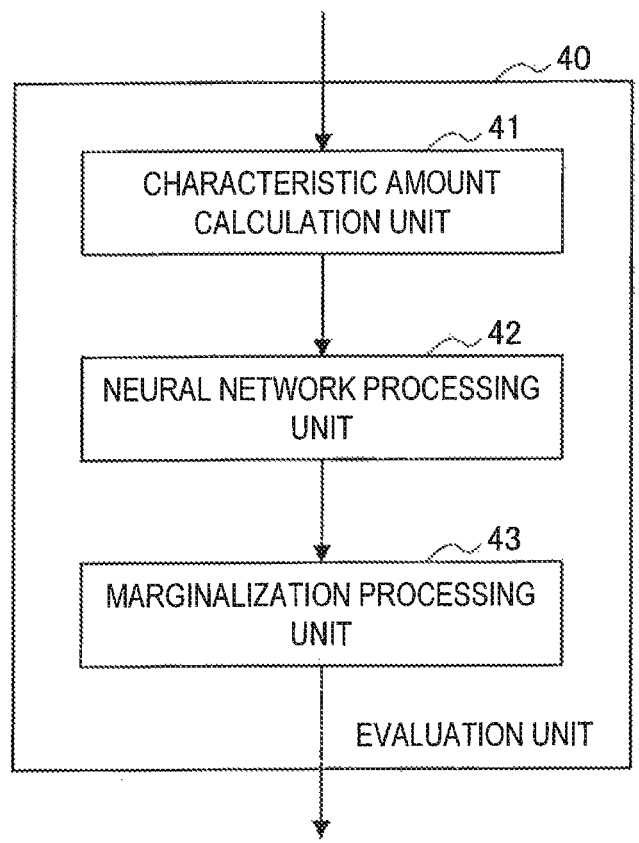
FIG. 10 is a block diagram illustrating the configuration of an evaluation unit.

As illustrated in FIG. 10, the evaluation unit 40 includes a characteristic amount calculation unit 41, a neural network processing unit 42, and a marginalization processing unit 43.

(Configuration of Characteristic Amount Calculation Unit)

The characteristic amount calculation unit 41 generates various characteristic amount maps (calculation characteristic amounts) based on the parallax maps or the like given from the first parallax detection unit 20 and the second parallax detection unit 30. For example, the characteristic amount calculation unit 41 generates a local occlusion map based on the local parallax map. Here, the local occlusion map indicates local occlusion information for each left-side pixel. The local occlusion information indicates a distance from any criterion position (for example, the position of an imaging sensor that photographs a subject) to a subject depicted in the left-side pixel.

Likewise, the characteristic amount calculation unit 41 generates a global occlusion map based on the global parallax map. The global occlusion map indicates global occlusion information for each left-side pixel. The global occlusion information indicates a distance from any criterion position (for example, the position of an imaging sensor that photographs a subject) to a subject depicted in the left-side pixel. The characteristic amount calculation unit 41 generates an absolute value occlusion map based on the local occlusion map and the global occlusion map. The absolute value occlusion map indicates absolute value occlusion information for each left-side pixel. The absolute value occlusion information indicates an absolute value of a difference value between the local occlusion information and the global occlusion information.

The characteristic amount calculation unit 41 generates an absolute value parallax map. The absolute value parallax map indicates an absolute value of a horizontal parallax difference for each left-side pixel. Here, the horizontal parallax difference is a value obtained by subtracting horizontal parallax d1 of the local parallax map from horizontal parallax d1 of the global parallax map.

The characteristic amount calculation unit 41 generates a local sum-of-absolute-difference (SAD) map based on the input images $V_L$ and $V_R$ given from the image acquisition unit 10 and the local parallax map. The local SAD map indicates a local SAD for each left-side pixel. The local SAD is a value obtained by subtracting the luminance of a left-side pixel from the luminance of a correspondence pixel. The correspondence pixel is a right-side pixel that has an x coordinate obtained by adding horizontal parallax d1 indicated by the local parallax map to the x coordinate of a left-side pixel and a y coordinate obtained by adding vertical parallax d2 indicated by the local parallax map to the y coordinate of the left-side pixel.

Likewise, the characteristic amount calculation unit 41 generates a global sum-of-absolute-difference (SAD) map based on the input images $V_L$ and $V_R$ given from the image acquisition unit 10 and the global parallax map. The global SAD map indicates a global SAD for each left-side pixel. The global SAD is a value obtained by subtracting the luminance of a left-side pixel from the luminance of a correspondence pixel. The correspondence pixel is a right-side pixel that has an x coordinate obtained by adding horizontal parallax d1 indicated by the global parallax map to the x coordinate of a left-side pixel and a y coordinate obtained by adding the vertical parallax d2 indicated by the global parallax map to the y coordinate of the left-side pixel.

The characteristic amount calculation unit 41 generates an absolute value SAD map based on the local SAD map and the global SAD map. The absolute SAD map indicates an absolute value SAD for each left-side pixel. The absolute SAD indicates an absolute value of a value obtained by subtracting the global SAD from the local SAD.

The characteristic amount calculation unit 41 generates a mean parallax map by calculating an arithmetic mean of the horizontal parallax d1 indicated by the global parallax map and the horizontal parallax d1 indicated by the local parallax map for each left-side pixel. The mean parallax map indicates the above arithmetic mean value for each left-side pixel.

The characteristic amount calculation unit 41 generates a dispersion parallax map by calculating a dispersion value (a dispersion value of the above arithmetic mean value) of the horizontal parallax d1 indicated by the global parallax map for each left-side pixel. The characteristic amount calculation unit 41 outputs the characteristic amount maps to the neural network processing unit 42. The characteristic amount calculation unit 41 may generate at least two characteristic amount maps.

(Neural Network Processing Unit)

The neural network processing unit 42 acquires output values Out0 to Out2 by setting the characteristic amount maps as input values In0 to In(m−1) of a neural network. Here, m is an integer equal to or greater than 2 and equal to or less than 11.

Specifically, the neural network processing unit 42 sets one left-side pixel among the left-side pixels included in each characteristic amount map as an evaluation target pixel and acquires a value corresponding to the evaluation target pixel from each characteristic amount map. The neural network processing unit 42 sets this value as an input value.

The output value Out0 indicates whether the horizontal parallax d1 and the vertical parallax d2 of the evaluation target pixel indicated by the unified parallax map can also be referred to in a subsequent frame. That is, the output value Out0 indicates the degree of temporal confidence. Specifically, the output value Out0 is set to "0" or "1." For example, "0" means that the horizontal parallax d1 and the vertical parallax d2 may not be referred to in a subsequent frame. For example, "1" means that the horizontal parallax d1 and the vertical parallax d2 can be referred to in a subsequent frame.

The output value Out1 indicates which parallax has the higher degree of confidence between the horizontal parallax d1 and the vertical parallax d2 of the evaluation target pixel indicated by the global parallax map and the horizontal parallax d1 and the vertical parallax d2 of the evaluation target pixel indicated by the local parallax map. That is, the output value Out1 indicates the degree of comparison confidence. Specifically, the output value Out1 is set to "0" or "1." For example, "0" indicates that the local parallax map has the higher degree of confidence than the global parallax map. For example, "1" indicates that the global parallax map has the higher degree of confidence than the local parallax map.

The output value Out2 is not particularly limited and can serve as, for example, information available in various applications. More specifically, the output value Out2 may serve as occlusion information of the evaluation target pixel. The occlusion information of the evaluation target pixel indicates a distance from any criterion position (for example, the position of am imaging sensor that photographs a subject) to a subject depicted in the evaluation target pixel and is available in generation of a multi-viewpoint image by the naked-eye stereoscopic display device. The output value Out2 can also serve as motion information regarding the evaluation target pixel. The motion information regarding the evaluation target pixel is information (for example, vector information indicating the size and the direction of motion) regarding motion of a subject depicted in the evaluation target pixel. The motion information is available in a 2D 3D conversion application. The output value Out2 can also serve as luminance conversion information regarding the evaluation target pixel. The luminance conversion information regarding the evaluation target pixel is information indicating with which luminance the evaluation target pixel is displayed and is available in a high dynamic range application.

The output value Out2 can also serve as various kinds of confidence degree information available in generation of a multi-viewpoint image. For example, the output value Out2 may serve as confidence degree information indicating whether the horizontal parallax d1 and the vertical parallax d2 of the evaluation target pixel can be referred to in the generation of the multi-viewpoint image. When the horizontal parallax d1 and the vertical parallax d2 of the evaluation target pixel may not be referred to, the naked-eye stereoscopic display device interpolates the horizontal parallax d1 and the vertical parallax d2 of the evaluation target pixel with the horizontal parallax d1 and the vertical parallax d2 of a pixel in the periphery of the evaluation target pixel. The output value Out2 can also serve as confidence degree information indicating whether the luminance of the evaluation target pixel can be added at the time of refinement of the multi-viewpoint image. The naked-eye stereoscopic display device performs the refinement by adding only the addible luminance among the luminances of respective pixels.

Figure 13:
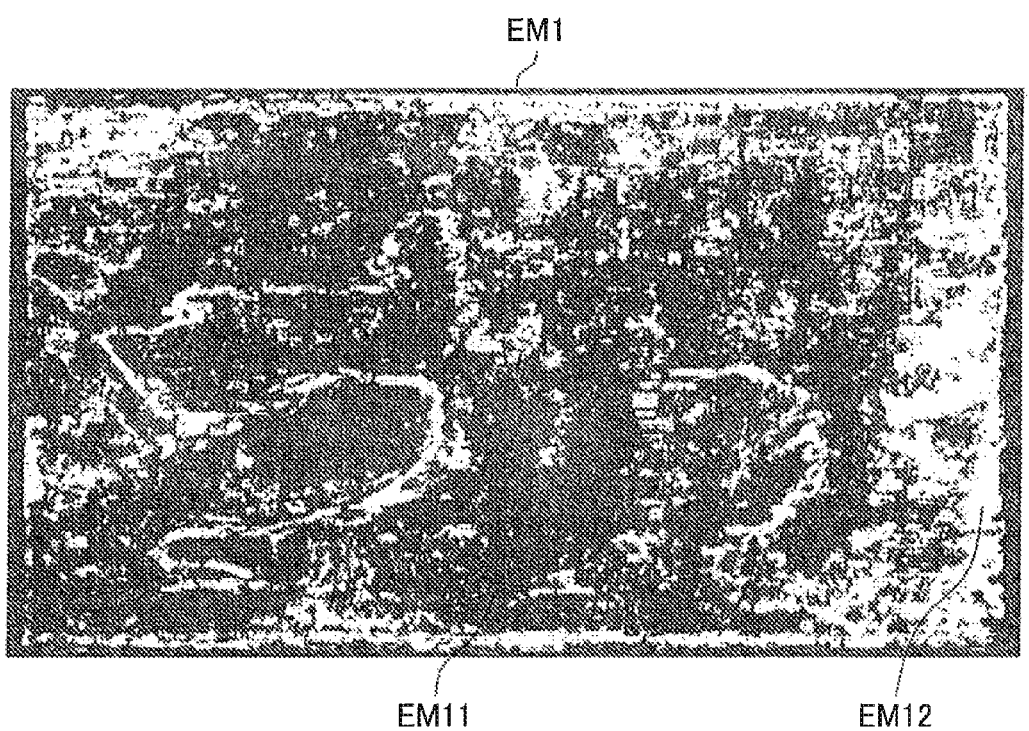
FIG. 13 is a diagram illustrating an example of a comparison confidence degree map.

The neural network processing unit 42 generates new input values In0 to In(m−1) by sequentially changing the evaluation target pixel and acquires output values Out0 to Out2. Accordingly, the output value Out0 is given as the degree of temporal confidence for each of the plurality of left-side pixels, that is, a temporal confidence degree map. The output value Out1 is given as the degree of comparison confidence for each of the plurality of left-side pixels, that is, a comparison confidence degree map. The output value Out2 is given as various kinds of information regarding each of the plurality of left-side pixels, that is, various information maps. The neural network processing unit 42 outputs these maps to the marginalization processing unit 43. FIG. 13 illustrates a comparison confidence degree map EM1 which is an example of the comparison confidence degree map. A region EM11 indicates a region in which the global parallax map has the higher degree of confidence than the local parallax map. A region EM12 indicates a region in which the local parallax map has the higher degree of confidence than the global parallax map.

As described above, the local matching has the advantage that whether accuracy is good does not depend on quality (the degree of color deviation, geometric deviation, or the like) of the input images $V_L$ and $V_R$, but has the disadvantage of being weak in occlusion and poor in stability (accuracy easily varies). On the other hand, the global matching has the advantage of being strong in occlusion and stable, but has the disadvantage that whether accuracy is good heavily depends on quality of the input images $V_L$ and $V_R$. However, the first parallax detection unit 20 performs searching in the vertical direction and also performs correction according to the color deviation when performing the global matching. That is, the first parallax detection unit 20 searches not only for the right-side pixel having the same y coordinate as the criterion pixel but also for a pixel present at a position deviated from the criterion pixel in the y direction when a $1^{st}$ criterion pixel is determined. The first parallax detection unit 20 uses the correction value α1 according to the color deviation, when a SAD is calculated. Thus, the first parallax detection unit 20 performs the global matching in which whether accuracy is good rarely depends on the quality of the input images $V_L$ and $V_R$. Accordingly, in this embodiment, since the global matching is higher than the local matching in the degree of confidence in many cases, the region EM11 is larger than the region EM12.

Figure 11:
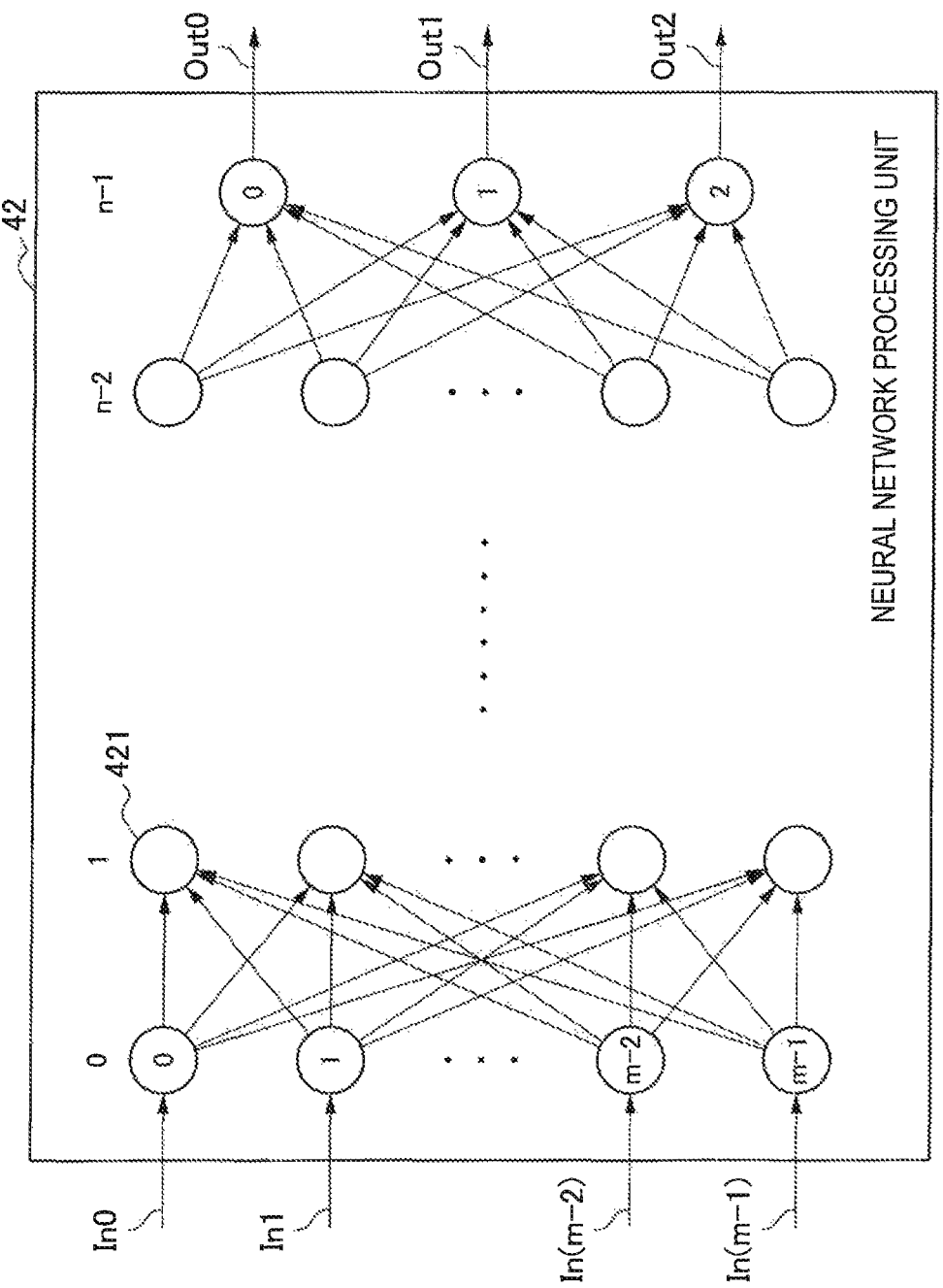
FIG. 11 is a block diagram illustrating the configuration of a neural network processing unit.

The neural network processing unit 42 has n layers, for example, as illustrated in FIG. 11. Here, n is an integer equal to or greater than 3. A $0^{th}$ layer is an input layer, $1^{st}$ to $(n-2)^{th}$ layers are intermediate layers, and an $(n-1)^{th}$ layer is an output layer. Each layer has a plurality of nodes 421. That is, the input layer and the intermediate layers have nodes ($0^{th}$ to $(m-1)^{th}$ nodes) corresponding to input values In0 to In(m-1). The output layer has 3 nodes ($0^{th}$ to $2^{nd}$ nodes). The output layer outputs the output values Out0 to Out2. Each node 421 is connected to all of the nodes 421 of the layers adjacent to this node 421. An output value from a $j^{th}$ node of a $k^{th}$ layer (where 1≤k≤n−1) is expressed in, for example, the following equation (6).

$$g_j^k = f\left(\sum_i g_i^{k-1} \omega_{j,i}^{k,k-1}\right) \quad (6)$$

where $g_j^k$ is an output value from the jth node of the kth layer;
$\omega_{j,i}^{k,k-1}$ is a propagation coefficient;
i is an integer of 0 to m−1;
$g_i^0$ are input values In0 to In(m−1);

$$\sum_i g_i^{k-1} \omega_{j,i}^{k,k-1}$$

is a network value of the jth node of the kth layer; and f(x) is a sigmoid function. In this equation, when the output value is one of Out0 and Out1, f(x) is expressed as in the following Equation (7).

Here, Th1 is a predetermined threshold value, $$f(x) = \begin{cases} 0 & (x \le Th1) \\ 1 & (x > Th1) \end{cases} \quad (7)$$

Also, when the output value is Out2 and Out2 indicates the confidence degree information, f(x) is expressed as in the foregoing Equation (7).

The neural network processing unit 42 performs learning in advance to acquire the appropriate output values Out0 to Out2. The learning is performed through, for example, back propagation. That is, the neural network processing unit 42 updates the propagation coefficient between an $(n-2)^{th}$ layer and the output layer based on the following Equation (8) and Equation (9).

$$\omega'^{n-1,n-2}_{j,i} = \omega^{n-1,n-2}_{j,i} + \eta g_i^{n-2} \delta_j \quad (8)$$

$$\delta_j = (b_j - u_j) u_j (1 - u_j) \quad (9)$$

where $\omega'^{n-1,n-2}_{j,i}$ is a value of the updated propagation coefficient $\omega^{n-1,n-2}_{j,i}$;
η is a learning coefficient (set in advance);
$u_j$ is an output value from the $j^{th}$ node of the output layer; and
$b_j$ is teacher information corresponding to $u_j$.

The neural network processing unit 42 gradually updates the propagation coefficient prior to the $(n-2)^{th}$ layer from a side close to the output layer based on the following Equation (10) to Equation (13).

$$\omega'^{k,k-1}_{j,i} = \omega^{k,k-1}_{j,i} + \eta g_i^{k-1} \delta_j^k \quad (10)$$

$$\delta_j^k = g_j^k (1 - g_j^k) \sum_i \delta_i^{k+1} \omega_{i,j}^{k+1,k} \quad (11)$$

$$\delta_i^{n-1} = \delta_i \quad (12)$$

$$\delta_i = (b_i - u_i) u_i (1 - u_i) \quad (13)$$

where $u_i$ is an output value from the $i^{th}$ node of the output layer;
$b_i$ is teacher information corresponding to $u_i$; and
$\omega'^{k,k-1}_{j,i}$ is a value of the updated propagation coefficient $\omega^{k,k-1}_{j,i}$.

Here, a left-eye image for a teacher, a right-eye image for a teacher, a left-eye criterion parallax map, and a right-eye criterion parallax map prepared in advance as templates can be used as the teacher information. Here, the left-eye image for the teacher corresponds to the input image $V_L$ and the right-eye image for the teacher corresponds to the input image $V_R$. The left-eye criterion parallax map is a parallax map created by setting a left-eye pixel that forms the left-eye image for the teacher as a criterion pixel. The right-eye criterion parallax map is a parallax map created by setting a right-eye pixel that forms the right-eye image for the teacher as a criterion pixel. That is, the teacher information regarding the input values In0 to In(m−1) and the output values Out0 to Out2 is calculated based on these templates. Further, the teacher information regarding the input values In0 to In(m−1) and the output values Out0 to Out2 is calculated based on templates altered from these templates (for example, a template in which noise is included in each image and a template in which at least one of color deviation and geometric deviation is caused in one image). The calculation of the teacher information may be performed in the naked-eye stereoscopic display device or may be performed by an external device. The neural network processing unit 42 is allowed to perform the learning by sequentially giving the teacher information to the neural network processing unit 42. The output values Out0 to Out2 strong in the color deviation and the geometric deviation can be obtained by allowing the neural network processing unit 42 to perform such learning.

A user can alter the templates so that the desired output values Out0 to Out2 can be obtained. That is, since a relation between the teacher information and the output values Out0 to Out2 follows a binomial distribution, a likelihood function L is given as in the following Equation (14).

$$L = \prod_i y_i^{t_i} \times (1 - y_i)^{(1-t_i)} \quad (14)$$

where $y_i$ are output values Out0 to Out2; and
$t_i$ is teacher information.

The distribution of the teacher information depends on the likelihood function L. Accordingly, the user may alter (weight) the templates so that likelihood is the maximum when the desired output values Out0 to Out2 are obtained. A likelihood function L' at the time of the weighting of the teacher information is given as in the following Equation (15).

$$L = \prod_i y_i^{w \times t_i} \times (1 - y_i)^{\overline{w} \times (1-t_i)} \quad (15)$$

where w and $\overline{w}$ are weights.

A part of the neural network processing unit 42 may be realized by hardware. For example, a process from the input layer to the $1^{st}$ layer may be fixed and the fixed process may be realized by hardware. The characteristic amount calculation unit 41 and the neural network processing unit 42 may generate the output value Out1, that is, the comparison confidence degree map, according to the following method. In the process, the neural network processing unit 42 performs no process by the neural network. That is, the characteristic amount calculation unit 41 generates a $1^{st}$ difference map indicating a difference between the global parallax map of the current frame and the global parallax map of the previous frame. The $1^{st}$ difference map indicates, for each left-side pixel, a value obtained by subtracting the horizontal parallax d1 of the global parallax map of the previous frame from the horizontal parallax d1 of the global parallax map of the current frame. Next, the neural network processing unit 42 generates a $1^{st}$ binarization difference map by binarizing the difference map. Then, the neural network processing unit 42 generates a $1^{st}$ difference score map by multiplying each value of the $1^{st}$ binarization difference map by a predetermined weight (for example, 8).

The characteristic amount calculation unit 41 generates edge images of the global parallax map of the current frame and the input image $V_L$ of the current frame and generates a correlation map indicating a correlation between the edge images. The edge image of the global parallax map indicates an edge portion (a contour portion of each image depicted in the global parallax map) of the global parallax map. Likewise, the edge image of the input image $V_L$ indicates an edge portion (a contour portion of each image depicted in the input image $V_L$) of the input image $V_L$. For example, a method of calculating the correlation, such as NCC, is arbitrarily used as a method of calculating the correlation between the edge images. The neural network processing unit 42 generates a binarization correlation map by binarizing the correlation map. Then, the neural network processing unit 42 generates a correlation score map by multiplying each value of the binarization correlation map by a predetermined weight (for example, 26).

The neural network processing unit 42 generates a confidence degree map for global matching by unifying the $1^{st}$ difference score map and the correlation score map and applying an IIR filter. The value of each left-side pixel of the confidence degree map for global matching indicates a larger value between the values of the difference score map and the correlation score map.

On the other hand, the characteristic amount calculation unit 41 generates a $2^{nd}$ difference map indicating a difference between the local parallax map of the current frame and the local parallax map of the previous frame. The $2^{nd}$ difference map indicates, for each left-side pixel, a value obtained by subtracting the horizontal parallax d1 of the local parallax map of the previous frame from the horizontal parallax d1 of the local parallax map of the current frame. Next, the neural network processing unit 42 generates a $2^{nd}$ binarization difference map by binarizing the $2^{nd}$ difference map. Then, the neural network processing unit 42 generates a $2^{nd}$ difference score map by multiplying each value of the $2^{nd}$ binarization difference map by a predetermined weight (for example, 16).

The characteristic amount calculation unit 41 generates an edge image of the input image $V_L$ of the current frame. The edge image indicates an edge portion (a contour portion of each image depicted in the input image $V_L$) of the input image $V_L$. The neural network processing unit 42 generates a binarization edge map by binarizing the edge image. The neural network processing unit 42 generates an edge score map by multiplying each value of the binarization edge map by a predetermined weight (for example, 8).

The neural network processing unit 42 generates a confidence degree map for local matching by unifying the $2^{nd}$ difference score map and the edge score map and applying an IIR filter. The value of each left-side pixel of the confidence degree map for local matching indicates a larger value between the values of the $2^{nd}$ difference score map and the edge score map.

Thus, the neural network processing unit 42 generates the confidence degree map for global matching by evaluating the global parallax map according to different evaluation methods and unifying the results. Likewise, the neural network processing unit 42 generates the confidence degree map for local matching by evaluating the local parallax map according to different evaluation methods and unifying the results. Here, the methods of evaluating the global parallax map are different from the methods of evaluating the local parallax map. Different weighting is performed according to the evaluation methods.

The neural network processing unit 42 determines which parallax map has the higher degree of confidence between the global parallax map and the local parallax map for each left-side pixel by comparing the confidence degree map for global matching and the confidence degree map for local matching. Based on the determination result, the neural network processing unit 42 generates the comparison confidence degree map that indicates the parallax map having the higher degree of confidence for each left-side pixel.

Figure 12:
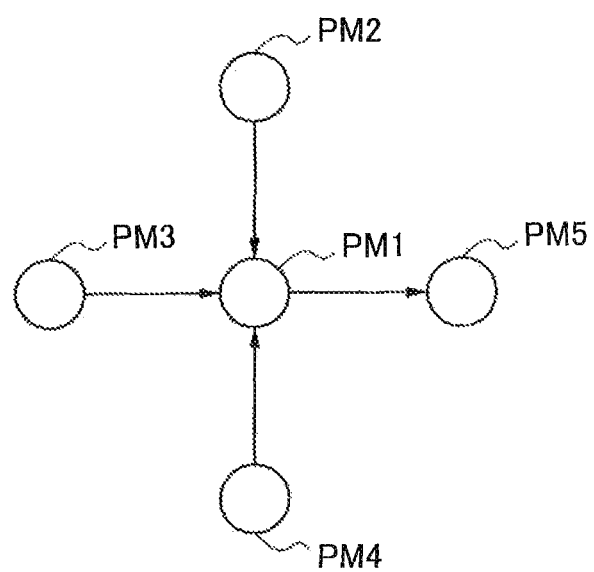
FIG. 12 is a diagram illustrating a process performed by a marginalization processing unit.

The marginalization processing unit 43 performs a marginalization (smoothing) process on each map given from the neural network processing unit 42. Specifically, the marginalization processing unit 43 sets one of the pixels included in the map as an integration criterion pixel and integrates the values (for example, the degree of comparison confidence and the degree of temporal confidence) of the integration criterion pixel and the pixels in the periphery of the integration criterion pixel. The marginalization processing unit 43 normalizes the integrated value to a range of 0 to 1 and propagates the result to the pixels adjacent to the integration criterion pixel. Hereinafter, an example of the marginalization process will be described with reference to FIG. 12. For example, the marginalization processing unit 43 sets a pixel PM1 as the integration criterion pixel and integrates the values of the integration criterion pixel PM1 and pixels PM2 to PM4 in the periphery of this integration criterion pixel. The marginalization processing unit 43 normalizes the integrated value to a range of 0 to 1. When the value of the integration criterion pixel PM1 is "0" or "1," the marginalization processing unit 43 performs the normalization by substituting the integrated value into the foregoing Equation (7). On the other hand, when the value of the integration criterion pixel PM1 is a real number within the range of 0 to 1, the marginalization processing unit 43 performs the normalization by substituting the integrated value into the sigmoid function.

The marginalization processing unit 43 propagates the normalized integrated value to the pixel PM5 right adjacent to the integration criterion pixel PM1. Specifically, the marginalization processing unit 43 calculates an arithmetic mean value of the integrated value and the value of the pixel PM5 and sets the arithmetic mean value as the value of the pixel PM5. The marginalization processing unit 43 may set the integrated value as the value of the pixel PM5 without performing any process. When performing such a marginalization process, the marginalization processing unit 43 sets an initial value (starting point) of the integration criterion pixel to a pixel (a pixel for which x=0) forming a left end of the map. In this example, the propagation direction is set to the right direction, but the propagation direction may be set to another direction (the left direction, the upper direction, or the lower direction).

The marginalization processing unit 43 may perform the marginalization process on the entire range of the map or may perform the marginalization process on a partial range. The map marginalization process may be performed by a lowpass filter. However, when the marginalization processing unit 43 performs the above-described process, it is possible to obtain the following advantages. That is, the lowpass filter may not perform the marginalization process except in a portion in which the value of a pixel is equal to or greater than a predetermined value in the map subjected to the marginalization process. On the other hand, the marginalization processing unit 43 can perform the marginalization process in the entire range or a desired range of the map. Further, since the marginalization process performed by the lowpass filter merely outputs a median value of the pixels, there is a probability that a problem may occur in the map due to the marginalization process. For example, there is a probability that a characteristic portion (for example, an edge portion of the map or a portion in which a subject is depicted) of the map may be marginalized unnaturally. However, since the marginalization processing unit 43 integrates the values of the plurality of pixels and performs the marginalization process using the integrated value obtained in this way, a characteristic portion of the map can be marginalized so as to be activated.

The marginalization processing unit 43 outputs the comparison confidence degree map subjected to the marginalization process to the map generation unit 50 illustrated in FIG. 5. The marginalization processing unit 43 outputs the temporal confidence degree map subjected to the marginalization process to the first parallax detection unit 20 and the second parallax detection unit 30. The temporal confidence degree map output to the first parallax detection unit 20 and the second parallax detection unit 30 is used in the subsequent frame. The marginalization processing unit 43 supplies a map of various kinds of information subjected to the marginalization process to an application in which the map of various kinds of information is necessary.

(Configuration of Map Generation Unit)

The map generation unit 50 generates the unified parallax map based on the global parallax map, the local parallax map, and the comparison confidence degree map. The horizontal parallax d1 and the vertical parallax d2 of each left-side pixel of the unified parallax map indicate a value of the higher degree of confidence between the values indicated by the global parallax map and the local parallax map. Here, the unified parallax map generated through the above-described process is a left-eye unified parallax map corresponding to the input image $V_L$. The image processing device 1 generates a right-eye unified parallax map corresponding to the input image $V_R$ by setting the input image $V_R$ as a criterion and performing the above-described process. The map generation unit 50 outputs the right-eye unified parallax map and the left-eye unified parallax map to the correction unit 60. Based on these unified parallax maps, the correction unit 60 corrects the parallax vector of the occlusion pixel and outputs the corrected right-eye unified parallax map and the corrected left-eye unified parallax map to the map generation unit 50. The map generation unit 50 supplies the corrected unified parallax maps to a multi-viewpoint image generation application in the naked-eye stereoscopic display device. The map generation unit 50 outputs the corrected unified parallax maps to the first parallax detection unit 20. The unified parallax maps output to the first parallax detection unit 20 are used in the subsequent frame.

The map generation unit 50 calculates the correction value α1 based on the input images $V_L$ and $V_R$ and the corrected unified parallax maps. That is, the map generation unit 50 searches for the correspondence pixel corresponding to the left-side pixel from the input image $V_R$ based on the unified parallax maps. The x coordinate of the correspondence pixel is a value obtained by adding the horizontal parallax d1 to the x coordinate of the left-side pixel. The y coordinate of the correspondence pixel is a value obtained by adding the vertical parallax d2 to the y coordinate of the left-side pixel. The map generation unit 50 searches for the correspondence pixels corresponding to all of the left-side pixels.

Figure 14:
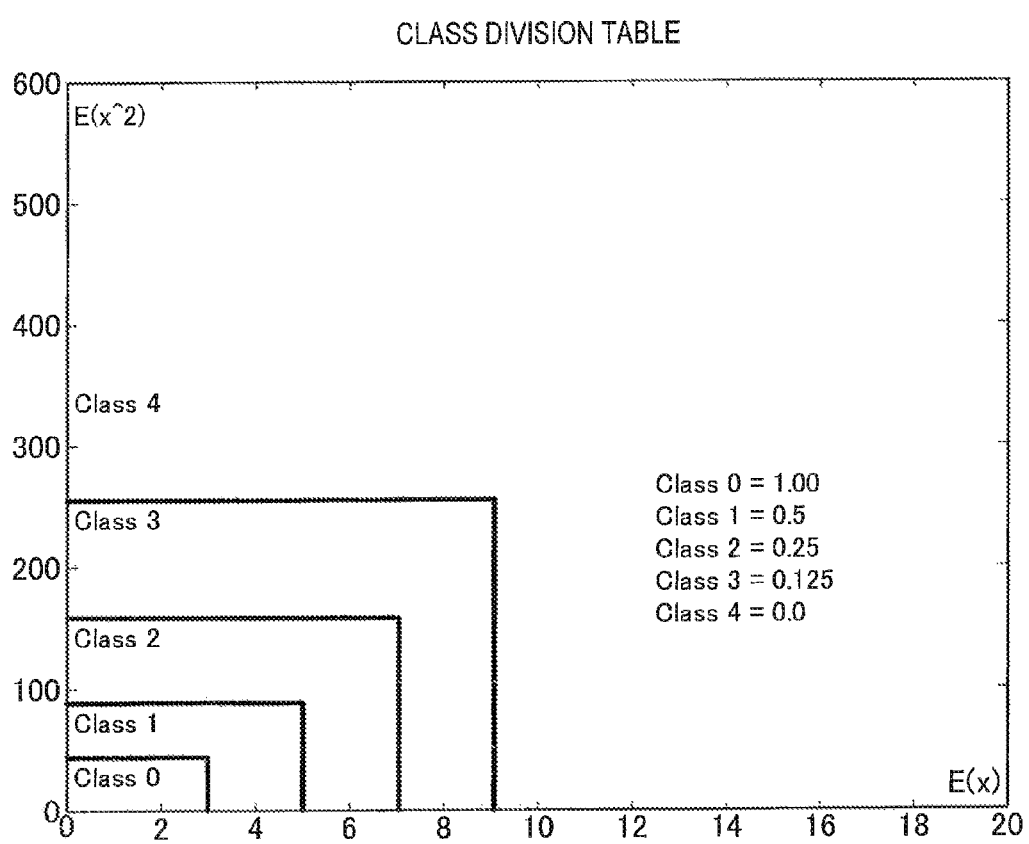
FIG. 14 is a diagram illustrating an example of a class division table.
Figure 15:
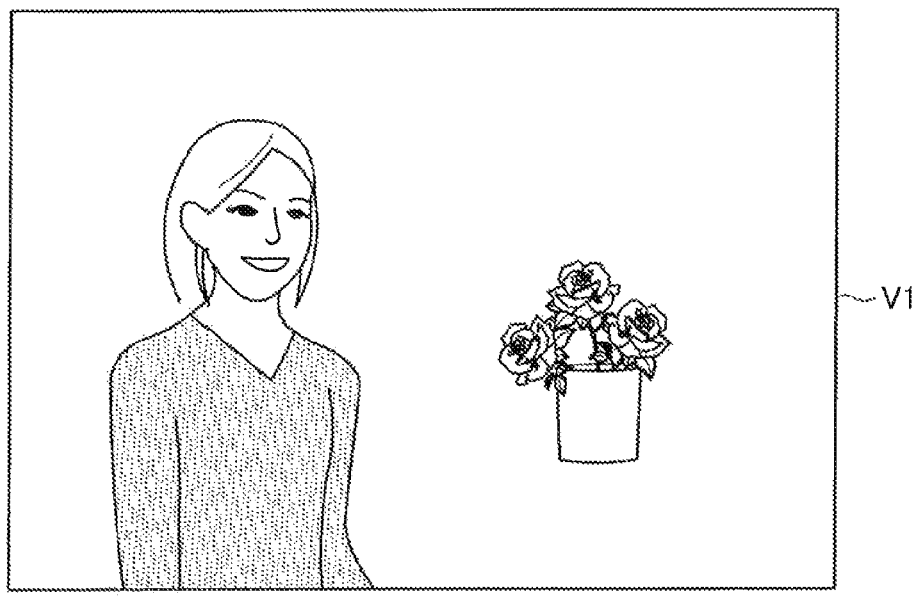
FIG. 15 is a diagram illustrating an example of an image classified to class 0.
Figure 16:
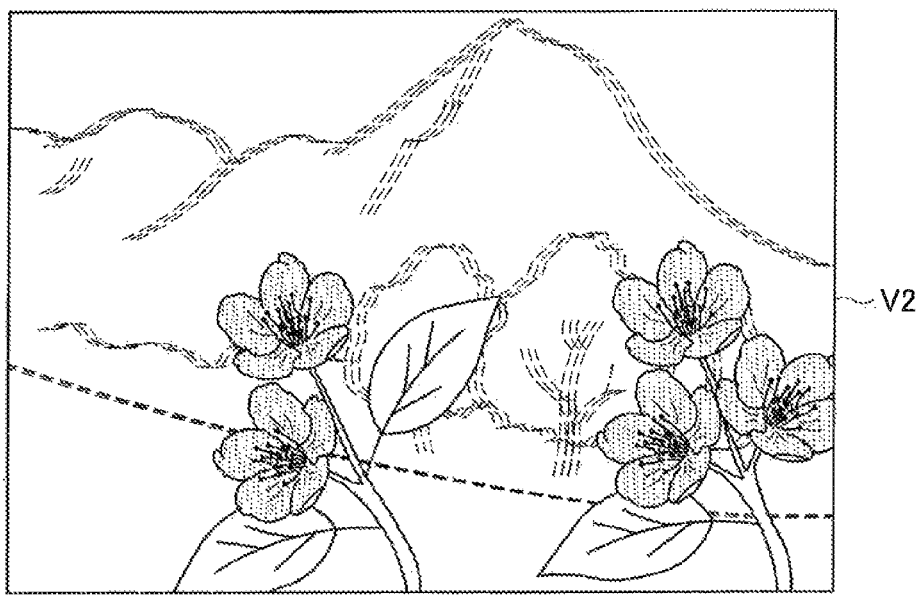
FIG. 16 is a diagram illustrating an example of an image classified to class 4.

The map generation unit 50 calculates luminance differences $\Delta Lx$ (difference values) between the left-side pixels and the correspondence pixels and calculates an arithmetic mean value $E(x)$ of the luminance differences $\Delta Lx$ and an arithmetic mean value $E(x^2)$ of the powers of the luminance differences $\Delta Lx$. The map generation unit 50 determines classes of the input images $V_L$ and $V_R$ based on the calculated arithmetic mean values $E(x)$ and $E(x^2)$ and a class division table illustrated in, for example, FIG. 14. Here, the class division table is a table that indicates the classes of the input images $V_L$ and $V_R$ in association with the arithmetic mean values $E(x)$ and $E(x^2)$. The classes of the input images $V_L$ and $V_R$ are divided into class 0 to class 4. The classes indicate intelligibility of the input images $V_L$ and $V_R$. As the value of the class is smaller, the input images $V_L$ and $V_R$ are more intelligible. For example, an image V1 illustrated in FIG. 15 is classified into class 0. The image V1 is photographed in a studio, and thus a subject is depicted comparatively intelligibly. On the other hand, an image V2 illustrated in FIG. 16 is classified into class 4. The image V2 is photographed outdoors, and thus a part of a subject (particularly, a background portion) is depicted comparatively unclearly.

The map generation unit 50 determines the correction value α1 based on a correction value correspondence table illustrated in FIG. 17 and the classes of the input images $V_L$, and $V_R$. Here, the correction value correspondence table is a table that indicates a correspondence relation between the classes of the input images $V_L$ and $V_R$ and the correction value α1. The map generation unit 50 outputs correction value information regarding the determined correction value α1 to the first parallax detection unit 20. The correction value α1 is used in the subsequent frame.

(Configuration of Correction Unit)

The correction unit 60 corrects the parallax vector of an occlusion pixel based on the right-eye unified parallax map and the left-eye unified parallax map. Specifically, the correction unit 60 sequentially traces the parallax vector setting a left-side pixel as a starting point.

More specifically, the correction unit 60 performs the following vector tracing process. That is, the correction unit 60 sets a left-side pixel as a criterion pixel and extracts the correspondence pixel indicated by the parallax vector of the criterion pixel from the right-eye unified parallax map. The correction unit 60 determines a matching property of the parallax vector of the criterion pixel and the parallax vector of the correspondence pixel. The above content of the vector tracing process has been described.

When the parallax vector of the criterion pixel is matched with the parallax vector of the correspondence pixel, the correction unit 60 sets the criterion pixel as an approximate pixel which approximates the occlusion pixel. The correction unit 60 calculates a correction parallax vector of the occlusion pixel based on the parallax vector of the approximate pixel. Specifically, the correction unit 60 sets the parallax vector of the approximate pixel as the correction parallax vector and substitutes the parallax vector of the occlusion pixel with the parallax vector of the approximate pixel (pulls the parallax vector of the approximate pixel to the occlusion pixel).

On the other hand, when the parallax vector of the criterion pixel is not matched with the parallax vector of the correspondence pixel, the correction unit 60 extracts a pixel indicated by the parallax vector of the correspondence pixel from the left-eye unified parallax map and sets this pixel as a new criterion pixel. Then, the correction unit 60 repeats the vector tracing process until the matching property of the parallax vectors is established.

In the example illustrated in FIG. 22, the correction unit 60 starts the vector tracing process setting the left-side pixel $P_L 20$ as a criterion pixel. The correction unit 60 finds the left-side pixel $P_L 30$ having the matched parallax vector by repeating the vector tracing process (in this example, twice). Then, the correction unit 60 sets the parallax vector of the left-side pixel $P_L 30$ as the correction parallax vector and substitutes the parallax vector of the left-side pixel $P_L 20$ with the parallax vector of the left-side pixel $P_L 30$.

The correction unit 60 corrects the left-eye unified parallax map by performing the above-described process on all of the left-side pixels of the left-eye unified parallax map. Likewise, the correction unit 60 corrects the right-eye unified parallax map. The correction unit 60 outputs the corrected unified parallax maps to the map generation unit 50. Thus, the correction unit 60 performs the above-described vector tracing process on all of the left-side pixels (or all of the right-side pixels) without performing explicit determination of whether each left-side pixel (or each right-side pixel) is an occlusion pixel.

3. Process Performed by Image Processing Device

Figure 18:
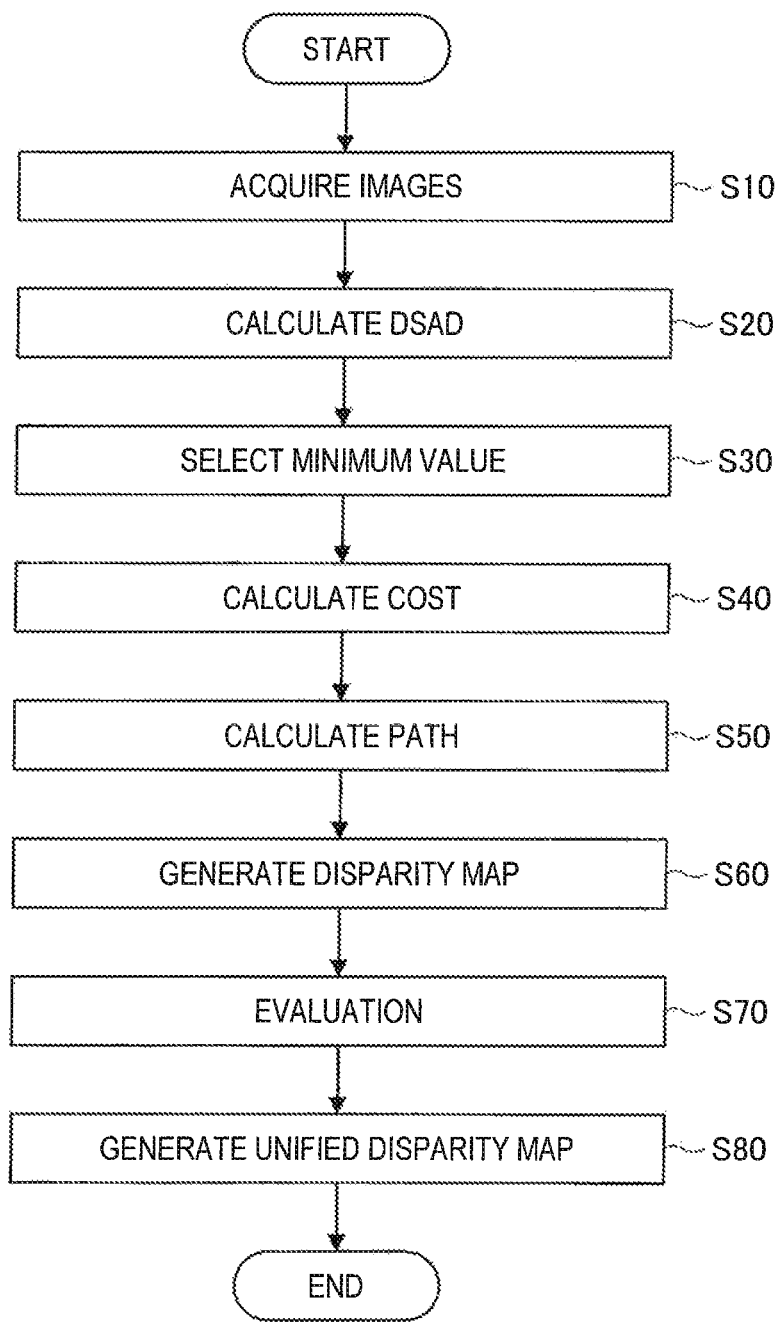
FIG. 18 is a flowchart illustrating a parallax detection order.

Next, the processing order performed by the image processing device 1 will be described with reference to the flowchart illustrated in FIG. 18.

In step S10, the image acquisition unit 10 acquires the input images $V_L$ and $V_R$ and outputs the input images $V_L$ and $V_R$ to each constituent element in the image processing device 1. In step S20, the DSAD calculation unit 22 acquires the correction value information regarding the correction value α1 from the map generation unit 50. When no correction value information is acquired (for example, the process is performed on the initial frame ($0^{th}$ frame)), the DSAD calculation unit 22 sets the correction value α1 to 0.

The DSAD calculation unit 22 acquires the global parallax map of the previous frame from the back track unit 27. The DSAD calculation unit 22 sets one left-side pixel as a criterion pixel and searches for the horizontal parallax d1 and the vertical parallax d2 of the previous frame of the criterion pixel from the global parallax map of the previous frame. The DSAD calculation unit 22 sets one right-side pixel having the vertical parallax d2 of the criterion pixel as a $1^{st}$ reference pixel. The DSAD calculation unit 22 sets the right-side pixel having the same y coordinate as the criterion pixel as the $1^{st}$ reference pixel when the global parallax map of the previous frame may not be acquired (for example, the process is performed on the $0^{th}$ frame).

The DSAD calculation unit 22 sets the right-side pixels present within a predetermined range of the $1^{st}$ reference pixel in the y direction as $2^{nd}$ reference pixels. The DSAD calculation unit 22 calculates DSAD($\Delta x$, j) expressed in the foregoing Equation (1) based on the criterion pixel, a reference pixel group including the $1^{st}$ and $2^{nd}$ reference pixels, and the correction value α1.

The DSAD calculation unit 22 calculates DSAD($\Delta x$, j) for all of the horizontal parallax candidates $\Delta x$. The DSAD calculation unit 22 changes the criterion pixel and repeats the above-described process. Thus, the DSAD calculation unit 22 calculates DSAD($\Delta x$, j) for all of the criterion pixels. The DSAD calculation unit 22 generates the DSAD information used to associate DSAD($\Delta x$, j) with the criterion pixels and outputs the DSAD information to the minimum value selection unit 23.

In step S30, the minimum value selection unit 23 performs the following process based on the DSAD information. That is, the minimum value selection unit 23 selects the minimum DSAD($\Delta x$, j) for each horizontal parallax candidate $\Delta x$. The minimum value selection unit 23 stores the selected DSAD($\Delta x$, j) in each node P (x, $\Delta x$) of the DP map for parallax detection illustrated in FIG. 9.

The minimum value selection unit 23 specifies the reference pixel corresponding to the minimum DSAD($\Delta x$, j) as a candidate pixel. The minimum value selection unit 23 sets a value obtained by subtracting the y coordinate of the criterion pixel from the y coordinate of the candidate pixel as a vertical parallax candidate Δy. The minimum value selection unit 23 stores the horizontal parallax candidate Δx and the vertical parallax candidate Δy in association therewith in the vertical parallax candidate storage table. The minimum value selection unit 23 performs the above-described process on all of the criterion pixels.

In step S40, the anchor vector construction unit 24 acquires the temporal confidence degree map of the previous frame from the evaluation unit 40 and acquires the unified parallax map of the previous frame from the map generation unit 50. The anchor vector construction unit 24 specifies the parallax-stable left-side pixel based on the temporal confidence degree map of the previous frame. The anchor vector construction unit 24 specifies the horizontal parallax d1 of the previous frame of the parallax-stable left-side pixel, that is, the stable horizontal parallax d1', based on the unified parallax map of the previous frame. The anchor vector construction unit 24 generates the anchor vector expressed in, for example, the foregoing Equation (2) for each parallax-stable left-side pixel. When the anchor vector construction unit 24 may not acquire the temporal confidence degree map and the unified parallax map of the previous frame, the anchor vector construction unit 24 sets all of the components of the matrix Md to 0. The anchor vector construction unit 24 generates the anchor vector information used to associate the anchor vector with the parallax-stable left-side pixel and outputs the anchor vector information to the cost calculation unit 25. Next, the cost calculation unit 25 updates the value of each node P (x, d) of the DP map for parallax detection based on the anchor vector information.

In step S50, the left-eye image horizontal difference calculation unit 261 acquires the input image $V_L$ from the image acquisition unit 10. The left-eye image horizontal difference calculation unit 261 calculates the luminance horizontal difference $dw_L$ for each of the left-side pixels included in the input image $V_L$ and generates the luminance horizontal difference information regarding the luminance horizontal difference $dw_L$. Then, the left-eye image horizontal difference calculation unit 261 outputs the luminance horizontal difference information to the weight calculation unit 263.

On the other hand, the right-eye image horizontal difference calculation unit 262 acquires the input image $V_R$ from the image acquisition unit 10 and performs the same process as the left-eye image horizontal difference calculation unit 261 described above on the input image $V_R$. Then, the right-eye image horizontal difference calculation unit 262 outputs the luminance horizontal difference information generated through this process to the weight calculation unit 263.

Next, based on the luminance horizontal difference information, the weight calculation unit 263 calculates the weights $wt_L$ of all of the left-side pixels and the weights $wt_R$ of all of the right-side pixels.

Next, based on the weight information given from the weight calculation unit 263, the path calculation unit 264 calculates an accumulated cost from the starting point of the DP map for parallax detection to each node P (x, Δx).

The path calculation unit 264 selects the minimum cost among the calculated accumulated costs DFI(x, Δx)$_0$ to DFI(x, Δx)$_2$ and sets the selected cost as the accumulated cost DFI(x, Δx) of the node P (x, Δx). The path calculation unit 264 calculates the accumulated costs DFI(x, Δx) of all of the nodes P (x, Δx) and stores the accumulated costs DFI(x, Δx) in the DP map for parallax detection.

Next, the back track unit 27 calculates the shortest path, that is, a path with the minimum accumulated cost from the starting point to the ending point, by tracking the path with the minimum accumulated cost backward from the ending point to the starting point. The node on the minimum path becomes the horizontal parallax d1 of the left-side pixel corresponding to this node. Accordingly, the back track unit 27 detects the horizontal parallax d1 of each left-side pixel by calculating the shortest path.

In step S60, the back track unit 27 acquires the vertical parallax candidate storage table corresponding to one left-side pixel from the vertical parallax candidate storage unit 21. The back track unit 27 specifies the vertical parallax candidate Δy corresponding to the horizontal parallax d1 of the left-side pixel based on the acquired vertical parallax candidate storage table and sets the specified vertical parallax candidate Δy as the vertical parallax d2 of the left-side pixel. Thus, the back track unit 27 detects the vertical parallax d2. The back track unit 27 detects the vertical parallax d2 of all of the left-side pixels and generates the global parallax map based on the detected horizontal parallax d1 and vertical parallax d2. The back track unit 27 outputs the generated global parallax map to the DSAD calculation unit 22, the evaluation unit 40, and the map generation unit 50.

On the other hand, the second parallax detection unit 30 acquires the input images $V_L$ and $V_R$ from the image acquisition unit 10. The second parallax detection unit 30 acquires the temporal confidence degree map of the previous frame from the evaluation unit 40 and acquires the unified parallax map of the previous frame from the map generation unit 50.

Next, the second parallax detection unit 30 specifies the parallax-stable left-side pixel based on the temporal confidence degree map of the previous frame. Then, based on the unified parallax map of the previous frame, the second parallax detection unit 30 specifies the horizontal parallax d1 and the vertical parallax d2 of the previous frame of the parallax-stable left-side pixel, that is, the stable horizontal parallax d1' and the stable vertical parallax d2'. Then, the anchor vector construction unit 24 adds the stable horizontal parallax d1' and the stable vertical parallax d2' to the xy coordinates of the parallax-stable left-side pixel, respectively, and sets the right-side pixel with the xy coordinates obtained in this way as the parallax-stable right-side pixel.

The second parallax detection unit 30 divides each of the input images $V_L$ and $V_R$ into a plurality of pixel blocks. Then, the second parallax detection unit 30 detects the correspondence pixel corresponding to each left-side pixel in the left-side pixel block from the right-side pixel block corresponding to the left-side pixel block. Here, the second parallax detection unit 30 preferentially detects the parallax-stable right-side pixel as the correspondence pixel when detecting the correspondence pixel corresponding to the parallax-stable left-side pixel. The second parallax detection unit 30 sets a value obtained by subtracting the x coordinate of the left-side pixel from the x coordinate of the correspondence pixel as the horizontal parallax d1 of the left-side pixel and sets a value obtained by subtracting the y coordinate of the left-side pixel from the y coordinate of the correspondence pixel as the vertical parallax d2 of the left-side pixel. The second parallax detection unit 30 generates the local parallax map based on the detection result. The second parallax detection unit 30 outputs the generated local parallax map to the evaluation unit 40.

The second parallax detection unit 30 performs the above-described process without detecting the parallax-stable left-side pixel when the temporal confidence degree map and the unified parallax map of the previous frame may not be acquired.

In step S70, the characteristic amount calculation unit 41 generates two or more characteristic amount maps based on the parallax maps and the like given from the first parallax detection unit 20 and the second parallax detection unit 30 and outputs the characteristic amount maps to the neural network processing unit 42.

Next, the neural network processing unit 42 sets one left-side pixel among the left-side pixels included in each characteristic map as an evaluation target pixel and acquires a value corresponding to this evaluation target pixel from each characteristic amount map. Then, neural network processing unit 42 sets these values as the input values In0 to In(m−1) and acquires the output values Out0 to Out2.

The neural network processing unit 42 generates new input values In0 to In(m−1) by sequentially changing the evaluation target pixel and acquires the output values Out0 to Out2. Thus, the neural network processing unit 42 generates the temporal confidence degree map, the comparison confidence degree map, and various information maps. The neural network processing unit 42 outputs these maps to the marginalization processing unit 43.

Next, the marginalization processing unit 43 performs a marginalization (smoothing) process on each of the maps given from the neural network processing unit 42. The marginalization processing unit 43 outputs the comparison confidence degree map subjected to the marginalization process to the map generation unit 50. The marginalization processing unit 43 outputs the temporal confidence degree map subjected to the marginalization process to the first parallax detection unit 20 and the second parallax detection unit 30. The marginalization processing unit 43 supplies the various information maps subjected to the marginalization process to an application in which the various information maps are necessary.

In step S80, the map generation unit 50 generates the unified parallax map based on the global parallax map, the local parallax map, and the comparison confidence degree map. Here, the unified parallax map generated through the above-described process is the left-eye unified parallax map corresponding to the input image $V_L$. The image processing device 1 generates the right-eye unified parallax map corresponding to the input image $V_R$ by setting the input image $V_R$ as a criterion and performing the above-described process. The map generation unit 50 outputs the right-eye unified parallax map and the left-eye unified parallax map to the correction unit 60. Based on these unified parallax maps, the correction unit 60 corrects the parallax vector of the occlusion pixel and outputs the corrected right-eye unified parallax map and the corrected left-eye unified parallax map to the map generation unit 50. The map generation unit 50 supplies the corrected unified parallax maps to a multi-viewpoint image generation application in the naked-eye stereoscopic display device. The map generation unit 50 outputs the corrected unified parallax maps to the first parallax detection unit 20. Since the multi-viewpoint image generation application can perform a process based on the unified parallax maps in which the parallax vector of the occlusion pixel is stable, the multi-viewpoint image can be stably generated.

The map generation unit 50 calculates the correction value α1 based on the input images $V_L$ and $V_R$ and the corrected unified parallax maps. That is, the map generation unit 50 calculates the arithmetic mean value $E(x)$ of the luminance differences ΔLx and the arithmetic mean value $E(x^2)$ of the powers of the luminance differences ΔLx based on the input images $V_L$ and $V_R$ and the unified parallax maps. The map generation unit 50 determines classes of the input images $V_L$ and $V_R$ based on the calculated arithmetic mean values $E(x)$ and $E(x^2)$ and the class division table illustrated in FIG. 14.

Next, the map generation unit 50 determines the correction value α1 based on a correction value correspondence table illustrated in FIG. 17 and the classes of the input images $V_L$ and $V_R$. The map generation unit 50 outputs correction value information regarding the determined correction value α1 to the first parallax detection unit 20. Thereafter, the image processing device 1 ends the process.

Figures 19A, 19B, 19C:
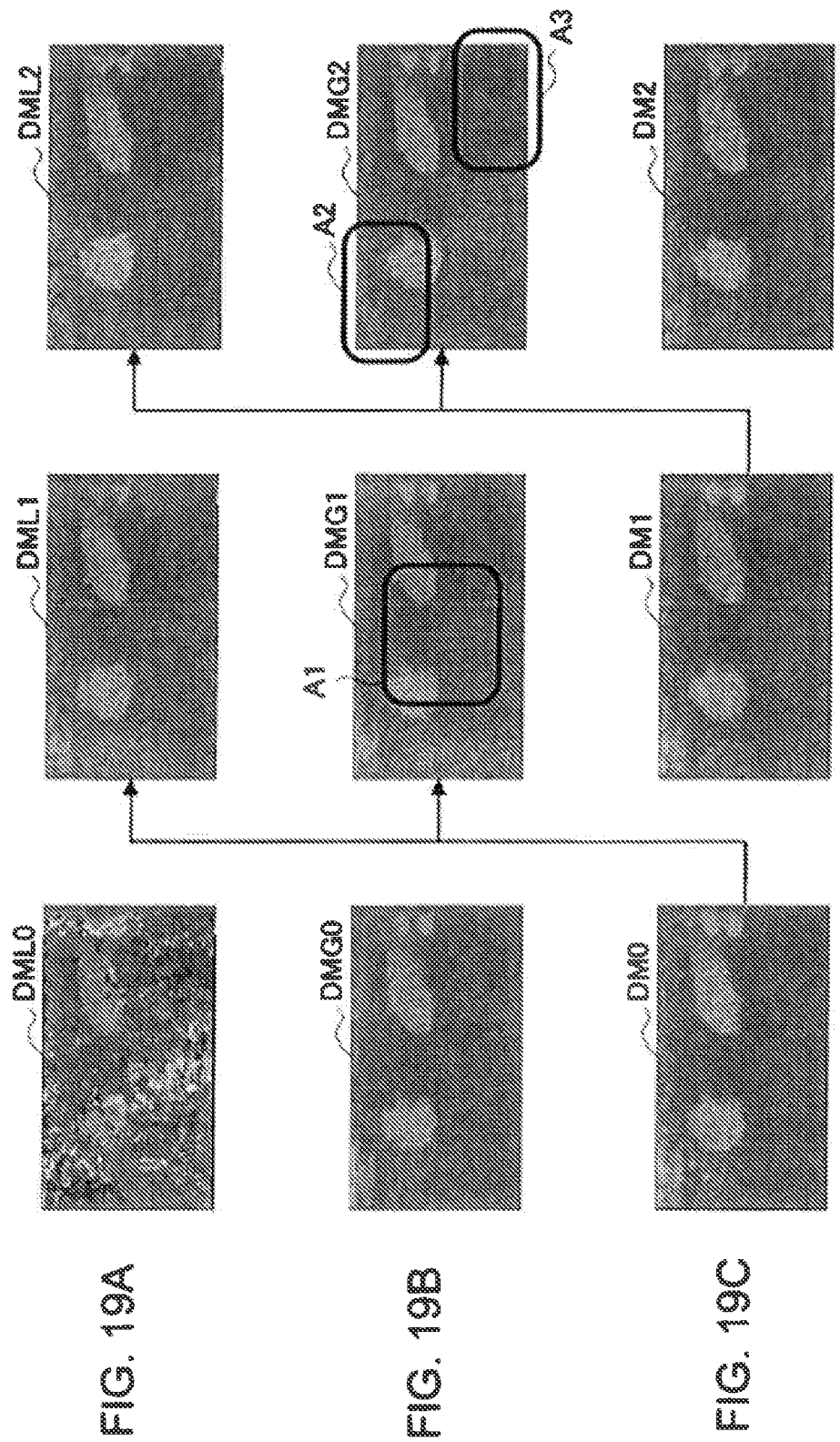
FIGS. 19A to 19C are diagrams illustrating states in which accuracy of each disparity map improves over time.

FIGS. 19A to 19C are diagrams illustrating cases in which the local parallax map, the global parallax map, and the corrected unified parallax map are updated over time. FIG. 19A illustrates a state in which the local parallax map is updated. FIG. 19B illustrates a state in which the global parallax map is updated. FIG. 19C illustrates a state in which the unified parallax map is updated.

Dot noise is seen in a local parallax map DML0 of the $0^{th}$ frame (#0). This is because the local matching has the disadvantage of being weak in occlusion and poor in stability (accuracy easily varies) and the temporal confidence degree map may not be referred to in the $0^{th}$ frame.

Likewise, slight streaks (stripe-like noise) are seen in a global parallax map DMG0 of the $0^{th}$ frame (#0). This is because whether accuracy is good heavily depends on the quality of the input images $V_L$ and $V_R$ and the searching range in the y direction is slightly narrower than a subsequent frame in the local matching.

The dot noise and the streaks described above are rarely seen in a unified parallax map DM0 of the $0^{th}$ frame (#0). As described above, this is because the unified parallax map DM0 is a map obtained by unifying portions with the high degree of confidence in the local parallax map DML0 and the global parallax map DMG0.

The dot noise is rarely seen in a local parallax map DML1 of the $1^{st}$ frame (#1). As described above, this is because the second parallax detection unit 30 can generate the local parallax map DML1 based on the temporal confidence degree map and the unified parallax map of the $0^{th}$ frame.

Likewise, the streaks are rarely seen in a global parallax map DMG1 of the $1^{st}$ frame. For example, the streaks particularly decrease in a region A1. The first reason for this is that the first parallax detection unit 20 substantially expands the searching range in the y direction based on the global parallax map DMG0 of the $0^{th}$ frame when calculating the DSAD. The second reason for this is that the first parallax detection unit 20 preferentially selects the stable horizontal parallax d1' of the previous frame even in the current frame.

The accuracy of the unified parallax map DM1 of the $1^{st}$ frame (#1) is improved more than that of the unified parallax map DM0 of the $0^{th}$ frame. As described above, this is because the unified parallax map DM1 is a map obtained by unifying portions with the high degree of confidence in the local parallax map DML1 and the global parallax map DMG1.

Since the result of the $1^{st}$ frame is reflected in each of maps DML2, DMG2, and DM2 in the $2^{nd}$ frame, the accuracy is further improved. For example, the streaks particularly decrease in regions A2 and A3 in the global parallax map DMG2.

(Process Performed by Correction Unit)

Figure 21:
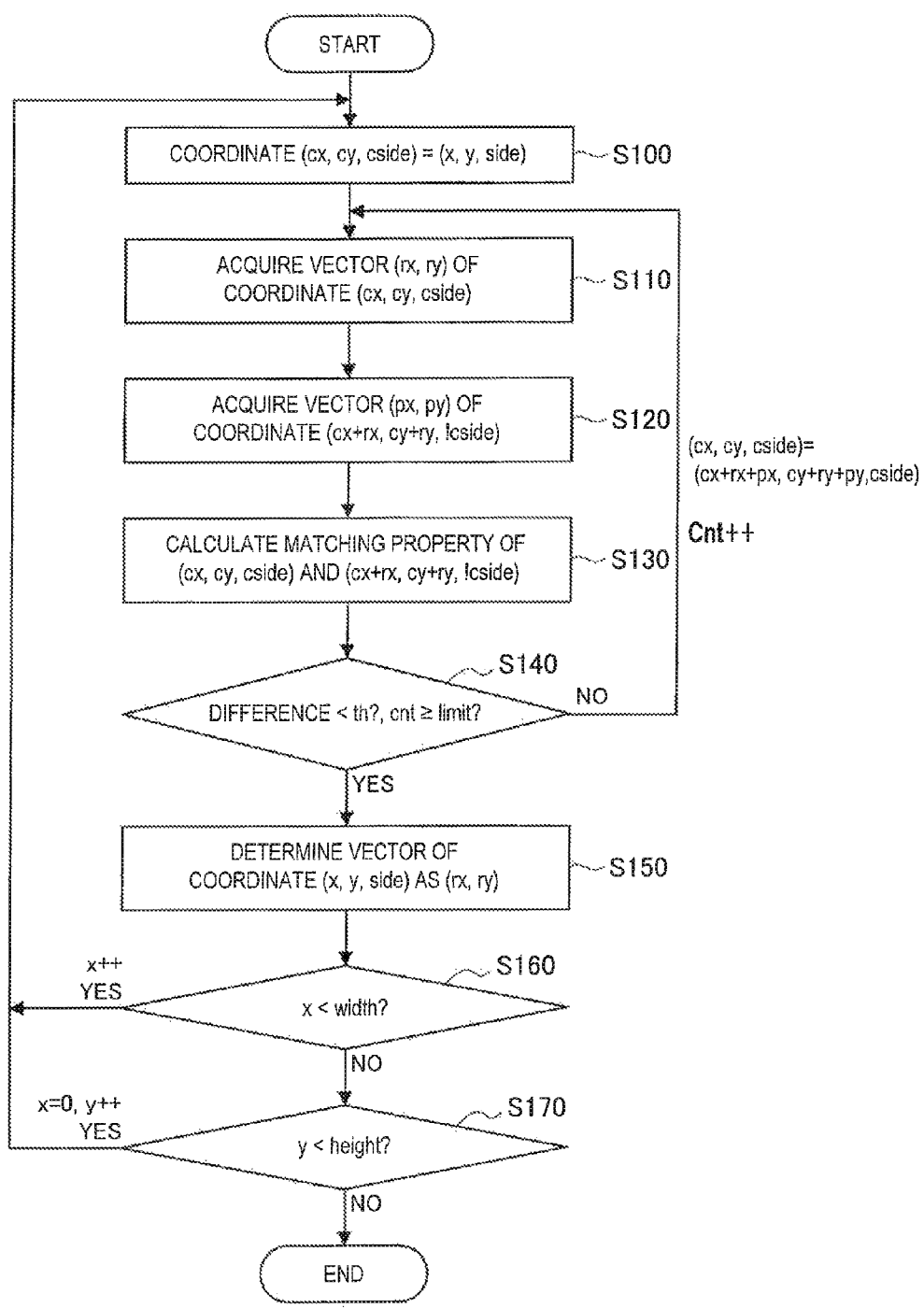
FIG. 21 is a flowchart illustrating a processing order performed by the correction unit.

Next, a processing order performed by the correction unit 60 will be described with reference to the flowchart illustrated in FIG. 21. When the correction unit 60 corrects the left-eye unified parallax map, (x, y, side) in the flowchart indicates a pixel of the left-eye unified parallax map, that is, a left-side pixel, and (x, y, !side) indicates a pixel of the right-eye unified parallax map, that is a right-side pixel. On the other hand, when the correction unit 60 corrects the right-eye unified parallax map, (x, y, side) indicates a right-side pixel and (x, y, !side) indicates a left-side pixel. The correction unit 60 performs the following process from the origin (0, 0, side). Here, a case in which the left-eye unified parallax map is corrected will be exemplified.

In step S100, the correction unit 60 sets a left-side pixel (x, y, side) as a criterion pixel (cx, cy, cside) and sets a count value (cnt) to 1. In step S110, the correction unit 60 acquires a parallax vector (rx, ry) of the criterion pixel. In step S120, the correction unit 60 acquires a correspondence pixel (cx+rx, cy+ry, !cside) indicated by the parallax vector of the criterion pixel from the right-eye unified parallax map. The correction unit 60 acquires a parallax vector (px, py) of the correspondence pixel.

In step S130, the correction unit 60 calculates the matching property of the criterion pixel and the correspondence pixel, that is, the matching property of the parallax vector (rx, ry) of the criterion pixel and the parallax vector (px, py) of the correspondence pixel. Specifically, the correction unit 60 calculates a difference d expressed in the following Equation (16).

$$d=\|(rx,ry)-(px,py)\| \quad (16)$$

In step S140, the correction unit 60 determines whether the parallax vector rx, ry) of the criterion pixel is matched with the parallax vector (px, py) of the correspondence pixel. Specifically, the correction unit 60 determines whether the difference d is less than a preset matching property threshold value th. When the correction unit 60 determines that the difference d is less than the matching property threshold value th, that is, the parallax vector of the criterion pixel is matched, the process proceeds to step S150.

Conversely, when the correction unit 60 determines that the difference d is equal to or greater than the matching property threshold value th, that is, the parallax vector of the criterion pixel is not matched, the correction unit 60 compares the count value with a preset count upper limit. When the correction unit 60 determines that the count value is equal to or greater than the count upper limit, the process proceeds to step S150. Conversely, when the correction unit 60 determines that the count value is less than the count upper limit, the correction unit 60 extracts a pixel indicated by the parallax vector of the correspondence pixel from the left-eye unified parallax map and sets this pixel as a new criterion pixel. The new criterion pixel is expressed in the following Equation (17). The correction unit 60 adds 1 to the count value. Thereafter, the correction unit 60 returns the process to step S110. Any value can be used as the count upper limit. However, when the image processing device 1 is realized by hardware, the count upper limit is set to, for example, 1. Even in this case, the parallax vector of the occlusion pixel is considerably improved.

$$(cx,cy,cside)=(cx+rx+px,cy+ry+py,cside) \quad (17)$$

In step S150, the correction unit 60 sets the criterion pixel as an approximate pixel which approximates the left-side pixel (x, y, side) and sets the parallax vector (rx, ry) of the approximate pixel as a correction parallax vector. Then, the correction unit 60 substitutes the parallax vector of the left-side pixel (x, y, side) with the correction parallax vector, that is, the parallax vector of the approximate pixel.

In step S160, the correction unit 60 determines whether the x coordinate of the left-side pixel is less than the width of the left-eye unified parallax map. When the correction unit 60 determines that the x coordinate of the left-side pixel is less than the width of the left-eye unified parallax map, the correction unit 60 adds 1 to the x coordinate and returns the process to step S100. Conversely, when the correction unit 60 determines that the x coordinate of the left-side pixel is equal to or greater than the width of the left-eye unified parallax map, the process proceeds to step S170.

In step S170, the correction unit 60 determines whether the y coordinate of the left-side pixel is less than the height of the left-eye unified parallax map. When the correction unit 60 determines that the y coordinate of the left-side pixel is less than the height of the left-eye unified parallax map, the correction unit 60 adds 0 and 1 to the x and y coordinates, respectively, and returns the process to step S100. Conversely, when the correction unit 60 determines that the y coordinate of the left-side pixel is equal to or greater than the height of the left-eye unified parallax map, the present process ends.

Accordingly, step S100 to step S140 correspond to the above-described vector tracing process. The correction unit 60 determines the matching property of the parallax vectors of all of the left-side pixels, irrespective of whether each left-side pixel is the occlusion pixel.

Figure 23:
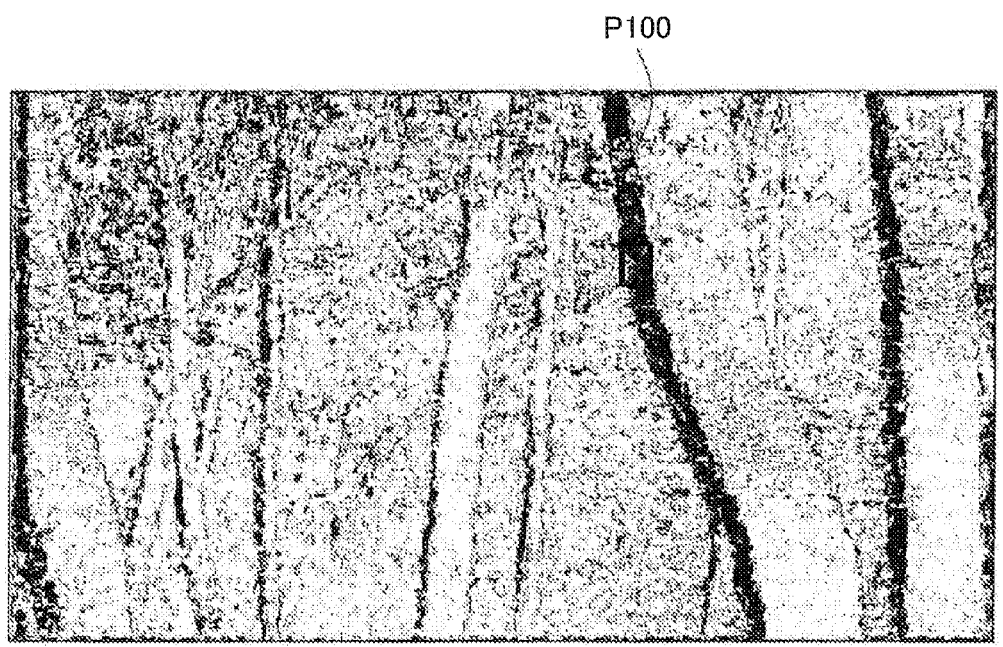
FIG. 23 is a diagram illustrating an example of a confidence degree map before the occlusion region is corrected.
Figure 24:
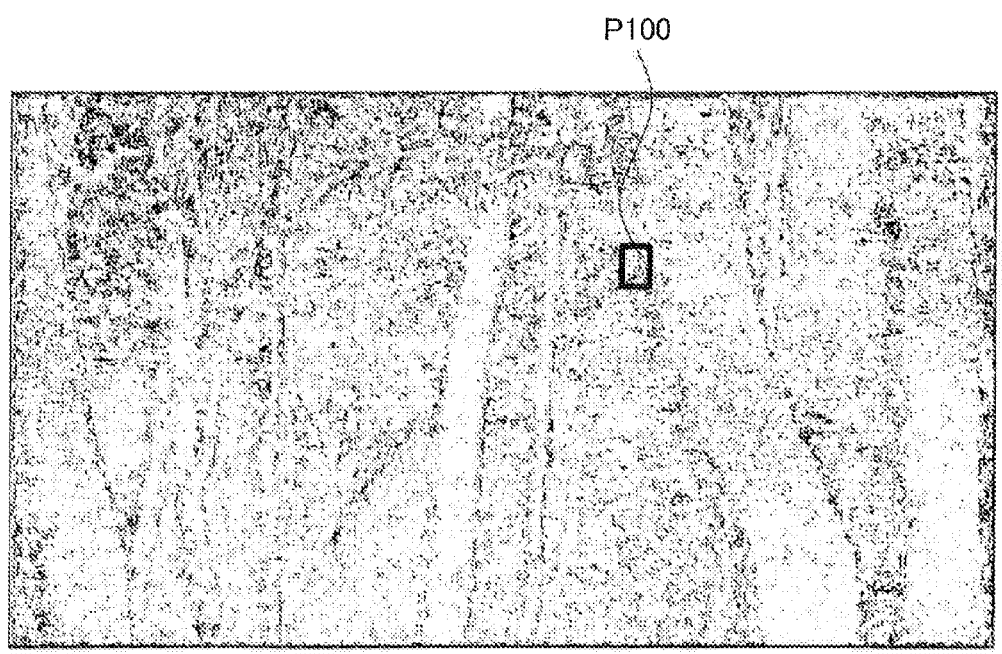
FIG. 24 is a diagram illustrating an example of the confidence degree map after the occlusion region is corrected.

FIG. 23 illustrates a left-eye temporal confidence degree map output when the process is not performed by the correction unit 60. A portion depicted in black indicates a portion in which the parallax vector is not stable, that is, an occlusion region. FIG. 24 illustrates a left-eye temporal confidence degree map output when the count upper limit is set to 1 and the process is performed by the correction unit 60. Both of the input images $V_L$ used as bases are the same. A portion shown by a frame P is depicted in black in FIG. 23, but is depicted in white in FIG. 24. In FIG. 24, black portions are overall decreased. Accordingly, the parallax vector of the occlusion region can be understood to become stable through the process performed by the correction unit 60. Even when the count upper limit is 1, a sufficient effect is expected.

4. Advantages of Image Processing Device

Next, advantages obtained from the image processing device 1 will be described. The image processing device 1 searches for an approximate pixel which approximates an occlusion pixel in one parallax map between the right-eye and the left-eye unified parallax maps based on the other parallax map. Based on the parallax vector of the approximate pixel, the image processing device 1 calculates the correction parallax vector of the occlusion pixel. Accordingly, the image processing device 1 can simply search for the parallax vector of the approximate pixel, since the image processing device 1 searches for the parallax vector of the approximate pixel based on the other parallax map. The image processing device 1 can more simply stabilize the parallax vector of the occlusion pixel, since the image processing device 1 substitutes the parallax vector of the occlusion pixel with the parallax vector of the approximate pixel.

The image processing device 1 can simply search for the approximate pixel, since the image processing device 1 searches for the approximate pixel based on the parallax vector of the occlusion pixel and the other parallax map.

The image processing device 1 extracts the correspondence pixel indicated by the parallax vector of the criterion pixel from the other parallax map and searches for the approximate pixel based on the parallax vector of the occlusion pixel and the parallax vector of the correspondence pixel. Accordingly, the image processing device 1 can simply search for the approximate pixel.

When the image processing device 1 performs the vector tracing process and determines that the parallax vector of the occlusion pixel is not matched with the parallax vector of the correspondence pixel, the image processing device 1 extracts a pixel indicated by the parallax vector of the correspondence pixel from the one parallax map as a new criterion pixel. Then, the image processing device 1 repeats the vector tracing process until the parallax vector of the criterion pixel is matched and sets the criterion pixel as the approximate pixel when the parallax vector of the criterion pixel is matched. Accordingly, the image processing device 1 can more simply search for the approximate pixel.

The image processing device 1 detects candidate pixels which are candidates of the correspondence pixel from the reference pixel group that includes the $1^{st}$ reference pixels included in the input image $V_R$ and the $2^{nd}$ reference pixels different from the $1^{st}$ reference pixel in the vertical position. The image processing device 1 stores the vertical parallax candidates $\Delta y$ indicating a distance from the vertical position of the criterion pixel to the vertical position of the candidate pixel in the vertical parallax candidate storage table.

Thus, the image processing device 1 searches for the candidate pixels which are candidates of the correspondence pixel in the vertical direction (y direction) and stores the vertical parallax candidates $\Delta y$ which are the searching result in the vertical parallax candidate storage table. Accordingly, since the image processing device 1 can search not only for the right-side pixels located at the same vertical position as the criterion pixel but also for the right-side pixels located at the different vertical position from the criterion pixel, the image processing device 1 can detect the horizontal parallax with high robustness and accuracy.

Since the pixel present within the predetermined range from the $1^{st}$ reference pixel in the vertical direction is included as the $2^{nd}$ pixel in the reference pixel group, the image processing device 1 can prevent the searching range in the y direction from being excessively broadened. That is, the image processing device 1 can prevent explosion of an optimization problem from occurring.

The image processing device 1 generates the reference pixel group for each of the $1^{st}$ reference pixels different from each other in the horizontal position and stores the vertical parallax candidates $\Delta y$ in the vertical parallax candidate storage table in association with the horizontal parallax candidates $\Delta x$. Thus, the image processing device 1 can generate the vertical parallax candidate storage table with higher accuracy.

Thus, the image processing device 1 stores the vertical parallax candidates $\Delta y$ in the vertical parallax candidate storage table by comparing the input images $V_L$ and $V_R$ (that is, performing the matching process). However, the image processing device 1 detects the horizontal parallax d1, for example, by calculating the shortest path after broadly storing the vertical parallax candidates $\Delta y$ in the vertical parallax candidate storage table. That is, the image processing device 1 broadly stores the vertical parallax candidates $\Delta y$, and then detects the horizontal parallax d1, for example, by calculating the shortest path. That is, since the image processing device 1 detects the horizontal parallax d1 by performing the matching process only once, the image processing device 1 can rapidly detect the horizontal parallax d1.

The image processing device 1 detects the vertical parallax candidate $\Delta y$ corresponding to the horizontal parallax d1 as the vertical parallax d2 of the criterion pixel among the vertical parallax candidates $\Delta y$ stored in the vertical parallax candidate storage table. Thus, the image processing device 1 can detect the vertical parallax d2 with high accuracy. That is, the image processing device 1 can perform the parallax detection strong in the geometric deviation.

The image processing device 1 sets the pixel with the vertical parallax d2 detected in the previous frame with respect to the criterion pixel of the current frame among the right-side pixels of the current frame as the 1st reference pixel of the current frame. Thus, the image processing device 1 can update the $1^{st}$ reference pixel, and thus form the reference pixel group by setting the $1^{st}$ reference pixel as a criterion. Accordingly, the image processing device 1 can substantially expand the searching range of the candidate pixels.

The image processing device 1 calculates DSAD($\Delta x$, j) based on the luminance difference $\Delta Lx$ between the input images $V_L$ and $V_R$, that is, the correction value $\alpha 1$ according to the color deviation and detects the candidate pixels based on DSAD($\Delta x$, j). Accordingly, the image processing device 1 can perform the parallax detection strong in the color deviation.

Since the image processing device 1 calculates DSAD ($\Delta x$, j) not only based on the criterion pixel and the $1^{st}$ and $2^{nd}$ reference pixels but also based on the luminances of the pixels in the periphery of these pixels, the image processing device 1 can calculate DSAD($\Delta x$, j) with high accuracy. In particular, since the image processing device 1 calculates DSAD($\Delta x$, j) based on the luminances of the pixels present at positions deviated in the y direction from the criterion pixel and the $1^{st}$ and $2^{nd}$ reference pixels, the image processing device 1 can perform the parallax detection strong in the geometric deviation also from this viewpoint.

Since the image processing device 1 calculates the correction value $\alpha 1$ based on the luminance differences $\Delta Lx$ between the input images $V_L$ and $V_R$ and the powers of the luminance differences $\Delta Lx$, the image processing device 1 can calculate the correction value $\alpha 1$ with high accuracy. In particular, the image processing device 1 calculates the luminance differences $\Delta Lx$ and the powers of the luminance differences $\Delta Lx$ for each left-side pixel and calculates the arithmetic mean value $E(x)$ and the arithmetic mean value $E(x^2)$. Since the image processing device 1 calculates the correction value $\alpha 1$ based on the arithmetic mean value $E(x)$ and the arithmetic mean value $E(x^2)$, the image processing device 1 can calculate the correction value $\alpha 1$ with high accuracy.

In particular, the image processing device 1 determines the classes of the input images $V_L$ and $V_R$ of the previous frame based on the class division table and calculates the correction value $\alpha 1$ based on the classes of the input images $V_L$ and $V_R$ of the previous frame. The classes indicate the intelligibility of the input images $V_L$ and $V_R$. Accordingly, the image processing device 1 can calculate the correction value $\alpha 1$ with higher accuracy.

The image processing device 1 calculates the various characteristic amount maps and sets the values of the characteristic amount maps as the input values In0 to In(m−1) of the neural network processing unit 42. The image processing device calculates, as the output value Out1, the degree of comparison confidence indicating the parallax map with the higher degree of confidence between the global parallax map and the local parallax map. Thus, the image processing device 1 performs the parallax detection with higher accuracy. That is, the image processing device 1 can generate the unified parallax map in which the portions with the high degree of confidence in these maps are combined.

Since the image processing device 1 calculates the output values Out0 to Out2 using the neural network, the accuracy of the output values Out0 to Out2 is improved. The maintenance property of the neural network processing unit 42 is improved (that is, the maintenance becomes easy). Since the nodes 421 are complicatedly connected, combinations of the nodes 421 become enormous. Accordingly, the image processing device 1 can improve the accuracy of the degree of comparison confidence.

The image processing device 1 calculates, as the output value Out0 the degree of temporal confidence indicating whether the unified parallax map can be referred to in the subsequent frame. Accordingly, the image processing device 1 can perform the parallax detection of the subsequent frame based on this degree of temporal confidence. Thus, the image processing device 1 can perform the parallax detection with higher accuracy. Specifically, the image processing device 1 generates the temporal confidence degree map indicating the degree of temporal confidence for each left-side pixel. Accordingly, the image processing device 1 can preferentially select the parallax with the high degree of temporal confidence between the horizontal parallax d1 and the vertical parallax d2 of each left-side pixel indicated by the unified parallax map even in the subsequent frame.

Since the image processing device 1 sets the DSAD as the score of the DP map for parallax detection, the score of the DP map for parallax detection can be calculated with higher accuracy than a case in which only the SAD is set as the score. Further, the parallax detection can be performed with high accuracy.

The image processing device 1 considers the weights $wt_L$ and $wt_R$ according to the horizontal difference when the image processing device 1 calculates the accumulated cost of each node P (x, d). Therefore, the accumulated cost can be calculated with high accuracy. Since the weights $wt_L$ and $wt_R$ decrease in edge portions and increase in flat portions, the smoothing can be performed appropriately according to an image.

The image processing device 1 generates the correlation map indicating a correlation between the edge images of the global parallax map and the input image $V_L$ and calculates the degree of confidence of the global parallax map based on the correlation map. Accordingly, the image processing device 1 can calculate the degree of confidence in a so-called streak region of the global parallax map. Therefore, the image processing device 1 can perform the parallax detection with high accuracy in the streak region.

The image processing device 1 evaluates the global parallax map and the local parallax map according to different evaluation methods when the image processing device 1 evaluates the global parallax map and the local parallax map. Therefore, the image processing device 1 can perform the evaluation in consideration of the characteristics.

Since the image processing device 1 generates the confidence degree map for the global matching and the confidence degree map for the local matching by applying the IIR filter to the maps respectively obtained according to the evaluation methods, the image processing device 1 can generate the temporarily stable confidence degree maps.

The image processing device 1 generates the unified parallax map by utilizing the parallax map with the higher degree of confidence between the global parallax map and the local parallax map. Accordingly, the image processing device 1 can accurately detect the parallax in a region in which it is difficult to detect an accurate parallax in the global matching and in a region in which it is difficult to detect accurate parallax in the local matching.

Since the image processing device 1 considers the generated unified parallax map in the subsequent frame, the image processing device 1 can perform the parallax detection with higher accuracy, compared to a case in which a plurality of matching methods are simply performed concurrently.

5. Various Modification Examples

Next, various modification examples of the embodiment will be described.

First Modification Example

A correction unit 60 according to a first modification example performs calculation and substitution of a correction parallax vector when a parallax vector of an occlusion pixel is calculated by the local matching. This is done for the following reason. That is, in the local matching, since the matching is performed within a given limited region, approximate pixels and occlusion pixels are located at close positions in many cases. In other words, the degree of confidence of the approximate pixels is high.

On the other hand, in the global matching, since the matching is performed on the entire input image as a target, there is a probability that the parallax vector of an occlusion pixel indicates a pixel having no relation with the occlusion pixel (a distance between the occlusion pixel and the pixel is very large). In this case, there is a probability that the correction unit 60 may set a pixel having no relation with the occlusion pixel as the approximate pixel when setting the parallax vector of the occlusion pixel as a starting point and follow the parallax vector. That is, there is a probability that the degree of confidence of the approximate pixel is low.

In the first modification example, the image processing device 1 determines whether to search for the approximate pixel based on a kind of matching method used to calculate the parallax vector of the occlusion pixel. Thus, the image processing device 1 can search for the approximate pixel with the higher degree of confidence.

Specifically, the image processing device 1 searches for the approximate pixel when the parallax vector of the occlusion pixel is calculated by the local matching. Accordingly, the image processing device 1 can search for the approximate pixel with the higher degree of confidence.

Second Modification Example

In a second modification example, the correction unit 60 performs the calculation and the substitution of the correction parallax vector on the occlusion pixel within the local parallax map. That is, in the second modification example, the map generation unit 50 outputs the local parallax map to the correction unit 60, and the correction unit 60 performs the process illustrated in FIG. 21 on the local parallax map. Then, the correction unit 60 outputs the corrected local parallax map to the map generation unit 50. The map generation unit 50 combines the global parallax map and the corrected local parallax map based on the temporal confidence degree map. When the map generation unit 50 combines the occlusion pixels, the map generation unit 50 may prefer the parallax vector of the local parallax map, irrespective of the value of the temporal confidence degree map.

In the second modification example, it is possible to obtain the same advantages as in the first modification example.

Third Modification Example

Figure 20:
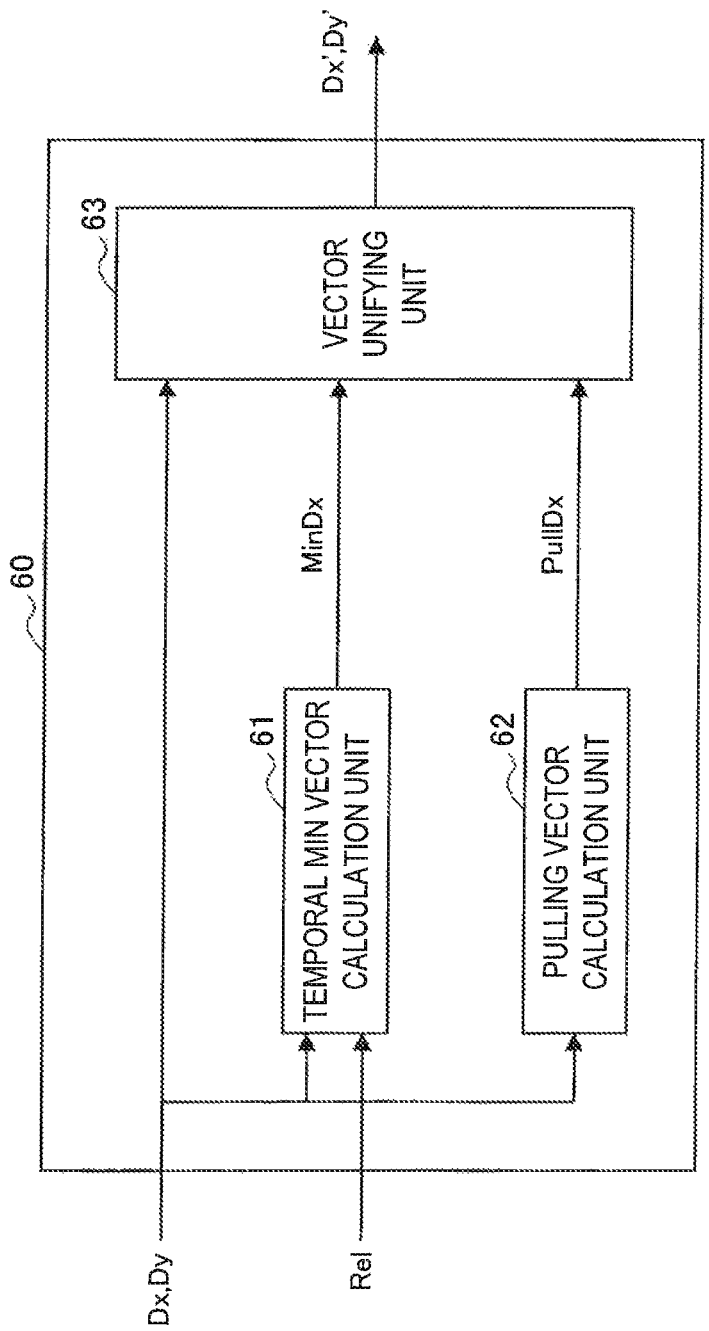
FIG. 20 is a block diagram illustrating the configuration of a correction unit.

Next, a third modification example will be described. First, the configuration of a correction unit 60 will be described with reference to FIG. 20. The correction unit 60 includes a temporal minimum vector (temporal Min vector) calculation unit 61, a pulling vector calculation unit 62, and a vector unifying unit 63. In the following description, a process of correcting a left-eye parallax map (a left-eye unified parallax map or the like) will be described as an example, but a right-eye parallax map can also be corrected likewise.

The temporal minimum vector calculation unit 61 acquires a left-eye unified parallax map of the current frame and a left-eye unified parallax map of the previous frame. The temporal minimum vector calculation unit 61 reverses (normalizes) signs of all of the parallax vectors (including the parallax vectors of the previous frame) in advance. When a right-eye unified parallax map is corrected, such normalization is not necessary. The temporal minimum vector calculation unit 61 sets one pixels as a pixel of interest in the unified parallax map of the current frame.

The temporal minimum vector calculation unit 61 sets a predetermined region (patch) including the pixel of interest. The temporal minimum vector calculation unit 61 sets the minimum vector including a sign among parallax vectors (Dx, Dy) of the current frame in the predetermined region and parallax vectors (Rel) of the previous frame as a temporal minimum vector (MinDx, MinDy) of the pixel of interest. The temporal minimum vector calculation unit 61 calculates the temporal minimum vectors of all of the pixels of the left-eye unified parallax map of the current frame. Here, there is a probability that the temporal minimum vector is a parallax vector of a subject located furthest inward among the subjects present in the predetermined region. The reason for this is as follows.

That is, it is easier to hide a stereoscopically viewed subject behind another subject as a distance from a user is larger (the subject is located further inward). The parallax vector of the subject decreases including a sign as the distance from the user is larger. On the other hand, there is a probability that a subject hidden behind a given frame is viewed as another frame (is displayed in both of the input images $V_L$ and $V_R$). Accordingly, there is a probability that the temporal minimum vector is the parallax vector of the subject located furthest inward among the subjects present in the predetermined region. The temporal minimum vector has characteristics in which the degree of confidence is high in an occlusion region and the degree of confidence is low in a non-occlusion region. The temporal minimum vector calculation unit 61 outputs the temporal minimum vector to the vector unifying unit 63. The temporal minimum vector calculation unit 61 may extract the temporal minimum vector not only based on the previous frame but also based on more previous frames. Thus, the degree of confidence of the temporal minimum vector is improved.

The pulling vector calculation unit 62 calculates the above-described pulling vector (PullDx, PullDy) based on the left-eye unified parallax map of the current frame and outputs the pulling vector (PullDx, PullDy) to the vector unifying unit 63. The pulling vector has characteristics in which the degree of confidence is high in both of an occlusion region and a non-occlusion region.

The vector unifying unit 63 acquires the left-eye unified parallax map and calculates the correction parallax vector by unifying the parallax vectors of the left-eye unified parallax map, that is, the original vector (Dx, Dy), the temporal minimum vector, and the pulling vector. Here, the vector unifying unit 63 calculates the correction parallax vectors of all of the pixels. That is, the vector unifying unit 63 calculates the correction parallax vectors of all of the pixels without performing explicit determination of whether each pixel of the left-eye unified parallax map is an occlusion pixel.

Specifically, the vector unifying unit 63 calculates a median (median value) of 3 original vectors (Dx, Dy), 3 temporal minimum vectors, and 3 pulling vectors and sets the median value as the correction parallax vector (Dx', Dy'). Here, the original vector has characteristics in which the degree of confidence is low in an occlusion region and the degree of confidence is high in a non-occlusion region. The vector unifying unit 63 may add 3 vectors by the same number. For example, the vector unifying unit 63 may add the 3 vectors each by four. Thus, in the third modification example, the 3 vectors are added by the same number. The reason for performing such a process is as follows.

That is, the vector unifying unit 63 does not perform explicit determination of whether each pixel is an occlusion pixel. In other words, the vector unifying unit 63 does not determine the degrees of confidence of the 3 vectors. On the other hand, in the 3 vectors, the degree of confidence increases in one of an occlusion pixel and a non-occlusion pixel. Therefore, in the vector unifying unit 63, the degree of feasibility that the degrees of confidence of the 3 vectors increase is the same. Therefore, the vector unifying unit 63 adds the 3 vectors by the same number. As in a fourth modification example to be described below, the vector unifying unit 63 decreases the addition number of vectors (the number of vectors used to calculate the median value) when it is apparent that the degrees of confidence of some of the vectors are low.

Thus, in the third modification example, the correction unit 60 calculates the correction parallax vector of the occlusion pixel based on the original vector, the temporal minimum vector, and the pulling vector of an occlusion pixel. Here, the degrees of confidence of two vectors are high among 3 vectors (the original vector, the temporal minimum vector, and the pulling vector) in all of the regions of the left-eye unified parallax map. Accordingly the degree of confidence of the correction parallax vector also increases. Accordingly, the correction unit 60 can more reliably stabilize the parallax vector of an occlusion pixel. In particular, since the correction parallax vector is calculated based on the temporal minimum vector, the correction parallax vector becomes more temporally stable.

This modification example is particularly suitable when the count upper limit is low at the time of calculation of the pulling vector, that is, when there is a probability that the pulling vector is not matched (does not converge). In this case, this is because, although there is a probability that the accuracy (stability) of the pulling vector is not sufficient, deficiency can be interpolated with the other vectors, that is, the temporal minimum vector and the original vector.

Fourth Modification Example

In the fourth modification example, of the 3 vectors, one vector (or two vectors) is calculated based on the global parallax map, and the remaining vectors are calculated based on the local parallax map. For example, only the temporal minimum vector is calculated based on the global parallax map and the other vectors are calculated based on the local parallax map. As described above, the parallax vector of the global parallax map is lower than the parallax vector of the local parallax map in the degree of confidence.

In this case, the vector unifying unit 63 causes the addition number of temporal minimum vectors to be less than that of the other vectors. For example, the vector unifying unit 63 sets the addition numbers of original vectors and pulling vectors to 4 and sets the addition number of temporal minimum vectors to 1. A total of the addition numbers may be the same as or may be different from that of the third modification example.

Accordingly, the vector unifying unit 63 performs weighting according to the degrees of confidence of the temporal minimum vector, the pulling vector, and the original vector of an occlusion pixel and calculates the correction parallax vector based on the weighted vectors. Thus, the vector unifying unit 63 can more reliably stabilize the parallax vector of the occlusion pixel.

Fifth Modification Example

In a fifth modification example, one vector is selected from 3 vectors by so-called machine learning. Specifically, first, the vector unifying unit 63 generates characteristic amount maps (calculation characteristic amounts) as in the above-described characteristic amount calculation unit 41 (see FIG. 10). The vector unifying unit 63 calculates a label expressed in the following Equation (18) for each pixel.

$$\text{label} = \underset{j}{\text{argminmin}} \frac{\exp(\omega_j \cdot x)}{\sum_i \exp(\omega_i \cdot x)} \quad (18)$$

In the equation, label is a class value indicating one of the 3 vectors, and i and j are each one integer of 1 to 3. Here, i and j indicate one of the 3 vectors. For example, when i and j are equal to 1, i and j indicate the original vector. When i and j are equal to 2, i and j indicate the temporal minimum vector. When i and j are equal to 3, i and j indicate the pulling vector. Here, $\omega_j$ is a coefficient corresponding to the vector indicated by j and $\omega_i$ is a coefficient corresponding to the vector indicated by i. Further, x indicates a calculation characteristic amount. Accordingly, Equation (18) can be said to be an equation indicating the correlation between the calculation characteristic amounts and the 3 vectors.

The vector unifying unit 63 learns the coefficients $\delta_i$ and $\omega_j$ by a teacher function prepared in advance, as in the above-described neural network. That is, the vector unifying unit 63 learns the correlation between the calculation characteristic amounts and the 3 vectors. Further, the neural network processing unit 42 may use the above-described output value Out2 as a class value of this modification example.

The vector unifying unit 63 selects one vector from the 3 vectors based on label and sets the selected vector as the correction parallax vector. Thus, the vector unifying unit 63 calculates the correction parallax vectors of all of the pixels without performing the explicit determination of whether each pixel is an occlusion pixel in this modification example as well. According to this modification example, since the vector unifying unit 63 learns the correlation between the calculation characteristic amounts and the 3 vectors and calculates the correction parallax vector based on the learning result, the vector unifying unit 63 can stabilize the parallax vector of the occlusion pixel more reliably.

Sixth Modification Example

In a sixth modification example, correction parallax vectors are calculated in consideration of special continuity of the correction parallax vectors. Specifically, a vector unifying unit 63 calculates error expressed in the following Equation (19) for each pixel.

$$\text{error} = \sum_i \|x_i - y_i\| + \sum_i \|\nabla x_i\| \quad (19)$$

In this equation, error is a class value indicating one of the 3 vectors. Here, i is an integer of 1 to 3 and the meaning of i is the same as that of the fifth modification example. Further, $x_i$ is an output value and $y_i$ is an input value. Specifically, xi is one of the 3 vectors. Further, $y_i$ is a parallax vector (for example, a parallax vector of the unified parallax map, a parallax vector of the local parallax map, or a parallax vector of the global parallax map) used to calculate $x_i$.

In Equation (19), the front-part of the equation means a score used to determine the 3 vectors and the rear-part of the equation means a difference between the class values of adjacent pixels, that is, a difference between vector values of the adjacent pixels. That is, the rear-part of the equation considers the spatial continuity of the correction parallax vectors.

The vector unifying unit 63 selects one vector from the 3 vectors based on error and sets the selected vector as the correction parallax vector. Thus, the vector unifying unit 63 calculates the correction parallax vectors of all of the pixels without performing the explicit determination of whether each pixel is an occlusion pixel in this modification example as well. According to this modification example, the vector unifying unit 63 calculates the score used to determine the 3 vectors and calculates the correction parallax vector of the occlusion pixel based on the score and the difference between the vector values of the adjacent pixels. Accordingly, the vector unifying unit 63 can stabilize the parallax vector of the occlusion pixel more reliably.

The preferred embodiments of the present disclosure have been described in detail above with reference to the appended drawings. However, the technical scope of the present disclosure is not limited to the examples. It should be understood by those skilled in the art that various modifications and combinations can be made within the scope of the technical spirit and essence described in the claims, and the modification and the combinations are, of course, construed to pertain to the technical scope of the present disclosure.

For example, in the above-described embodiments, the correction unit 60 searches for the approximate pixel in which the parallax vector is matched by following the parallax vector, but embodiments of the present disclosure are not limited to the examples. For example, the correction unit 60 may search for the approximate pixel by sequentially inspecting all of the pixels of the right-eye unified parallax map. The above-described modification examples may be combined. For example, the fifth and sixth modification examples may be combined. In this case, the calculated label is corrected in consideration of the spatial continuity of Label of each pixel.

In the above-described embodiments, the parallax vectors of the occlusion regions of the right-eye and left-eye parallax maps have been corrected, but embodiments of the present disclosure may be applied to an optical flow. In this case, for example, an optical flow of the current frame corresponds to the left-eye parallax map and an optical flow of the previous frame corresponds to the right-eye parallax map. A motion vector of each pixel of the current frame indicates the correspondence pixel of the previous frame and a motion vector of each pixel of the previous frame indicates the correspondence pixel of the current frame. Accordingly, the motion vector corresponds to the parallax vector. When the technology of the present embodiment is applied to the optical flow, the motion vector of an occlusion region in the optical flow can be corrected based on, for example, the pulling vector, the temporal minimum vector, and the original vector.

(1)
An image processing device including:
 a correction unit that searches for an approximate pixel which approximates an occlusion pixel in one parallax map between right-eye and left-eye parallax maps based on the other parallax map and calculates a correction parallax vector of the occlusion pixel based on a parallax vector of the approximate pixel.

(2)
The image processing device according to (1), wherein the correction unit searches for the approximate pixel based on a parallax vector of the occlusion pixel and the other parallax map.

(3)
The image processing device according to (2), wherein the correction unit extracts a correspondence pixel indicated by the parallax vector of the occlusion pixel from the other parallax map and searches for the approximate pixel based on the parallax vector of the occlusion pixel and a parallax vector of the correspondence pixel.

(4)
The image processing device according to (3), wherein the correction unit sets the occlusion pixel as a criterion pixel, extracts a correspondence pixel indicated by a parallax vector of the criterion pixel from the other parallax map, performs a vector tracing process of determining a matching property of the parallax vector of the occlusion pixel and a parallax vector of the correspondence pixel, extracts a pixel indicated by the parallax vector of the correspondence pixel from the one parallax map as a new criterion pixel when determining that the parallax vector of the occlusion pixel is not matched with the parallax vector of the correspondence pixel, and repeats the vector tracing process.

(5)
The image processing device according to any one of (1) to (4), wherein the correction unit determines whether to search for the approximate pixel based on a kind of matching method used in the calculation of the parallax vector of the occlusion pixel.

(6)
The image processing device according to (5), wherein the correction unit searches for the approximate pixel when the parallax vector of the occlusion pixel is calculated through local matching.

(7)
The image processing device according to any one of (1) to (6), wherein the correction unit detects a temporal minimum vector of which a value is minimum within a predetermined time among parallax vectors in a predetermined region including the occlusion pixel and calculates the correction parallax vector of the occlusion pixel based on the temporal minimum vector, the parallax vector of the approximate pixel, and the parallax vector of the occlusion pixel.

(8)
The image processing device according to (7), wherein the correction unit performs weighting according to degrees of confidence of the temporal minimum vector, the parallax vector of the approximate pixel, and the parallax vector of the occlusion pixel and calculates the correction parallax vector of the occlusion pixel based on the weighted vectors.

(9)
The image processing device according to (8), wherein the correction unit calculates a median value of the weighted vectors as the correction parallax vector of the occlusion pixel.

(10)
The image processing device according to (7), wherein the correction unit calculates a calculation characteristic amount of the occlusion pixel, learns a correlation among the calculation characteristic amount, the temporal minimum vector, the parallax vector of the approximate pixel, and the parallax vector of the occlusion pixel and calculates the correction parallax vector of the occlusion pixel based on a learning result.

(11)
The image processing device according to (7), wherein the correction unit calculates a score used to determine the temporal minimum vector, the parallax vector of the approximate pixel, and the parallax vector of the occlusion pixel and calculates the correction parallax vector of the occlusion pixel based on the score and a difference between vector values of adjacent pixels.

(12)
An image processing method including:
 searching for an approximate pixel which approximates an occlusion pixel in one parallax map between right-eye and left-eye parallax maps based on the other parallax map and calculating a correction parallax vector of the occlusion pixel based on a parallax vector of the approximate pixel.

(13)
A program for causing a computer to realize:
 a correction function of searching for an approximate pixel which approximates an occlusion pixel in one parallax map between right-eye and left-eye parallax maps based on the other parallax map and calculating a correction parallax vector of the occlusion pixel based on a parallax vector of the approximate pixel.

What is claimed is:
1. An image processing device comprising:
 a calculation unit that searches for an approximate pixel from among a plurality of candidate pixels which approximates an occlusion pixel based on a detected temporal minimum vector between the approximate pixel and the occlusion pixel between right-eye and left-eye parallax maps and calculates a correction parallax vector of the occlusion pixel based on a comparison between a parallax vector of the occlusion pixel and a parallax vector of the approximate pixel, wherein the temporal minimum vector is a value which is a minimum within a predetermined time among a plurality of parallax vectors corresponding to each of the plurality of candidate pixels in a predetermined region including the occlusion pixel; and
 a correction unit that corrects the parallax vector of the approximate pixel according to the calculated correction parallax vector of the occlusion pixel, wherein the calculation unit and the correction unit are each implemented via at least one processor.

2. The image processing device according to claim 1, wherein the calculation unit searches for the approximate pixel based on a parallax vector of the occlusion pixel and the other parallax map.

3. The image processing device according to claim 2, wherein the calculation unit extracts a correspondence pixel indicated by the parallax vector of the occlusion pixel from the other parallax map and searches for the approximate pixel based on the parallax vector of the occlusion pixel and a parallax vector of the correspondence pixel.

4. The image processing device according to claim 3, wherein the calculation unit sets the occlusion pixel as a criterion pixel, extracts a correspondence pixel indicated by a parallax vector of the criterion pixel from the other parallax map, performs a vector tracing process of determining a matching property of the parallax vector of the occlusion pixel and a parallax vector of the correspondence pixel, extracts a pixel indicated by the parallax vector of the correspondence pixel from the one parallax map as a new criterion pixel when determining that the parallax vector of the occlusion pixel is not matched with the parallax vector of the correspondence pixel, and repeats the vector tracing process.

5. The image processing device according to claim 1, wherein the calculation unit determines whether to search for the approximate pixel based on a kind of matching method used in the calculation of the parallax vector of the occlusion pixel.

6. The image processing device according to claim 5, wherein the calculation unit searches for the approximate pixel when the parallax vector of the occlusion pixel is calculated through local matching.

7. The image processing device according to claim 1, wherein the calculation unit performs weighting according to degrees of confidence of the temporal minimum vector, the parallax vector of the approximate pixel, and the parallax vector of the occlusion pixel and calculates the correction parallax vector of the occlusion pixel based on the weighted vectors.

8. The image processing device according to claim 7, wherein the calculation unit calculates a median value of the weighted vectors as the correction parallax vector of the occlusion pixel.

9. The image processing device according to claim 1, wherein the calculation unit calculates a calculation characteristic amount of the occlusion pixel, learns a correlation among the calculation characteristic amount, the temporal minimum vector, the parallax vector of the approximate pixel, and the parallax vector of the occlusion pixel and calculates the correction parallax vector of the occlusion pixel based on a learning result.

10. The image processing device according to claim 1, wherein the calculation unit calculates a score used to determine the temporal minimum vector, the parallax vector of the approximate pixel, and the parallax vector of the occlusion pixel and calculates the correction parallax vector of the occlusion pixel based on the score and a difference between vector values of adjacent pixels.

11. An image processing method, performed via at least one processor, the method comprising:
    searching for an approximate pixel from among a plurality of candidate pixels which approximates an occlusion pixel based on a detected temporal minimum vector between the approximate pixel and the occlusion pixel between right-eye and left-eye parallax maps and calculating a correction parallax vector of the occlusion pixel based on a comparison between a parallax vector of the occlusion pixel and a parallax vector of the approximate pixel; and
    correcting the parallax vector of the approximate pixel according to the calculated correction parallax vector of the occlusion pixel,
    wherein the temporal minimum vector is a value which is a minimum within a predetermined time among a plurality of parallax vectors corresponding to each of the plurality of candidate pixels in a predetermined region including the occlusion pixel.

12. A non-transitory computer-readable storage medium having embodied thereon a program, which when executed by a computer, causes the computer to perform a method, the method comprising:
    searching for an approximate pixel from among a plurality of candidate pixels which approximates an occlusion pixel between right-eye and left-eye parallax maps and calculating a correction parallax vector of the occlusion pixel based on a comparison between a parallax vector of the occlusion pixel and a parallax vector of the approximate pixel; and
    correcting the parallax vector of the approximate pixel according to the calculated correction parallax vector of the occlusion pixel,
    wherein the temporal minimum vector is a value which is a minimum within a predetermined time among a plurality of parallax vectors corresponding to each of the plurality of candidate pixels in a predetermined region including the occlusion pixel.

* * * * *